(12) United States Patent
Harimoto

(10) Patent No.: US 8,450,231 B2
(45) Date of Patent: May 28, 2013

(54) SILICON-CONTAINING PARTICLES, METHOD FOR MANUFACTURING THEREOF, OIL COMPOSITION, CERAMIC MATERIAL, AND METHOD FOR MANUFACTURING THEREOF

(75) Inventor: Yukinari Harimoto, Hadano (JP)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 0 days.

(21) Appl. No.: 12/990,182

(22) PCT Filed: Apr. 6, 2009

(86) PCT No.: PCT/JP2009/057413
§ 371 (c)(1),
(2), (4) Date: Oct. 28, 2010

(87) PCT Pub. No.: WO2009/133765
PCT Pub. Date: Nov. 5, 2009

(65) Prior Publication Data
US 2011/0045963 A1     Feb. 24, 2011

(30) Foreign Application Priority Data

Apr. 30, 2008 (JP) ................................ 2008-119361
Feb. 27, 2009 (JP) ................................ 2009-046410

(51) Int. Cl.
*C04B 35/14*         (2006.01)

(52) U.S. Cl.
USPC ........................................ 501/154; 428/402

(58) Field of Classification Search
None
See application file for complete search history.

(56) References Cited

U.S. PATENT DOCUMENTS

| | | |
|---|---|---|
| 3,293,194 A | 12/1966 | Lovie et al. |
| 4,312,970 A | 1/1982 | Gaul, Jr. |
| 4,340,619 A | 7/1982 | Gaul, Jr. |
| 4,395,460 A | 7/1983 | Gaul |
| 4,397,828 A | 8/1983 | Seyferth et al. |
| 4,404,153 A | 9/1983 | Gaul, Jr. |
| 4,482,689 A | 11/1984 | Haluska |
| 4,540,803 A | 9/1985 | Cannady |

(Continued)

FOREIGN PATENT DOCUMENTS

| | | |
|---|---|---|
| EP | 0964023 A2 | 12/1999 |
| GB | 736971 A | 9/1955 |

(Continued)

OTHER PUBLICATIONS

English language abstract for JP 3047567 extracted from espacenet.com database, Jan. 28, 2011, 18 pages.

(Continued)

*Primary Examiner* — Robert S Loewe
(74) *Attorney, Agent, or Firm* — Howard & Howard Attorneys PLLC

(57) ABSTRACT

This invention relates to a method for manufacturing silicon-containing particles characterized by preparing a uniform phase comprising a curable composition that includes a silicon-containing compound having in one molecule one or more reactive functional groups per 50 silicon atoms and an oil that does not participate in curing of the composition, then curing the composition, and causing phase separation from the oil for obtaining the silicon-containing particles; and to silicon-containing particles obtained by the above method. The method provides silicon-containing particles of an extremely small diameter in a simple process without the use of surfactants. And the silicon-containing particles possess excellent dispersibility in oil and a high degree of ceramification by baking.

12 Claims, 4 Drawing Sheets

U.S. PATENT DOCUMENTS

| | | | |
|---|---|---|---|
| 4,543,344 | A | 9/1985 | Cannady |
| 4,618,666 | A | 10/1986 | Porte |
| 4,639,501 | A | 1/1987 | Seyferth et al. |
| 4,719,273 | A | 1/1988 | Seyferth et al. |
| 4,774,312 | A | 9/1988 | Burns |
| 4,835,238 | A | 5/1989 | Burns |
| 4,916,200 | A | 4/1990 | Burns |
| 4,929,472 | A * | 5/1990 | Sugihara et al. ............... 427/215 |
| 4,929,742 | A | 5/1990 | Burns |
| 4,987,169 | A * | 1/1991 | Kuwata et al. ................. 524/267 |
| 5,047,261 | A | 9/1991 | Moussa et al. |
| 5,376,595 | A * | 12/1994 | Zupancic et al. ............... 501/12 |
| 5,654,362 | A * | 8/1997 | Schulz et al. .................. 524/862 |
| 5,880,210 | A * | 3/1999 | Schulz et al. .................. 524/731 |
| 5,928,660 | A * | 7/1999 | Kobayashi et al. ............ 424/401 |
| 5,929,162 | A * | 7/1999 | Horne et al. ................... 524/731 |
| 5,998,542 | A * | 12/1999 | Horne et al. ................... 524/731 |
| 6,174,982 | B1 | 1/2001 | Nishida et al. |
| 6,225,248 | B1 * | 5/2001 | Leiser et al. .................. 501/95.2 |
| 6,770,708 | B2 * | 8/2004 | Kadlec et al. .................. 524/588 |
| 6,936,686 | B2 * | 8/2005 | Awad ......................... 528/502 F |
| 6,972,129 | B1 * | 12/2005 | Ogawa et al. .................. 424/401 |
| 7,019,098 | B2 * | 3/2006 | Hupfield ......................... 528/31 |
| 8,110,630 | B2 * | 2/2012 | Lin et al. ........................ 524/588 |
| 2003/0104131 | A1 | 6/2003 | Konno et al. |
| 2007/0224509 | A1 * | 9/2007 | Aramata et al. .......... 429/231.95 |

FOREIGN PATENT DOCUMENTS

| | | |
|---|---|---|
| JP | 62201933 A | 9/1987 |
| JP | 03-047567 A | 2/1991 |
| JP | 3047567 A | 2/1991 |
| JP | 04-334551 A | 11/1992 |
| JP | 6055897 B | 7/1994 |
| JP | 10-074506 A | 3/1998 |
| JP | 10-175816 A | 6/1998 |
| JP | 10-212358 A | 8/1998 |
| JP | 10-275617 A | 10/1998 |
| JP | 2000-281903 A | 10/2000 |
| JP | 2003-171180 A | 6/2003 |
| JP | 2007-112693 A | 5/2007 |
| JP | 2007-294422 A | 11/2007 |
| WO | WO 9829476 A1 | 7/1998 |
| WO | WO 2007/109260 A2 | 9/2007 |

OTHER PUBLICATIONS

English language abstract for JP 04-334551 extracted from espacenet.com database, Oct. 1, 2010, 18 pages.
English language translation and abstract for JP 10-074506 extracted from PAJ database, Jan. 28, 2011, 53 pages.
English language translation and abstract for JP 10-275617 extracted from PAJ database, Jan. 28, 2011, 33 pages.
English language translation and abstract for JP 2000-281903 extracted from PAJ database, Jan. 28, 2011, 54 pages.
English language translation and abstract for JP 2003-171180 extracted from PAJ database, Jan. 28, 2011, 25 pages.
English language abstract for WO 9829476 extracted from espacenet.com database, Jan. 28, 2011, 30 pages.
PCT International Search Report for PCT/JP2009/057413, dated Feb. 10, 2010, 3 pages.
Article: Nametkin et al., "1,3-Dislacyclobutanes and their Polymers", A.V. Topchiev Institute of Petrochemical Synthesis, 1966, vol. 170, No. 5, pp. 972-975.
Article: Kriner., "Catalytic Polymerization of 1,3-Disilacyclobutane Derivatives", Journal of Polymer Science, Part A-1, vol. 4, 1966, pp. 444-446.
Article: Cundy et al., "The Role of the Transition Metal in the Homogeneous Catalytic Polymerisation . . . ", Journal of Organometallic Chemistry, 1972, No. 44, pp. 291-297.
Article: Nametkin et al., "Polymerization of Silacyclobutane Monomers Catalyzed by Halides of Variable Valence Metals", A.V. Topchieve Institute of Petrochemical Synthesis, 1973, vol. 208, No. 5, pp. 128-131.
Article: Burns et al., "Alkyl-and Arylsilsesquiazanes: Effect of the R group on Polymer Degradation and Ceramic Char Composition", Journal of Materials Science, 1987, No. 22, pp. 2609-2614.
Article: Dunogues et al., "New Polycarbosilane Models. 1. Poly [(methylchlorosilylene) methylene], a Novel, Functional Polycarbosilane", Macromlecules, 1988, No. 21, pp. 30-34.
Article: Delgado et al., "Contrasting One- and Two-Cation Binding Behavior in syn- and anti-Anthraquione Bibracchial Poland (BiP) . . . ", Journal of American Chemical Society, 1988, No. 110, pp. 119-124.
Article: Shono et al., "Electroreductive Formation of Polysilanes", J. Chem. Soc., Chem. Commu., 1990, pp. 1160-1161.
Article: Sakamoto et al., "Highly Ordered High Molecular Weight Alternating Polysilylene Copolymer Prepared by Anionic Polymerization of Masked Disilene", Macromolecules, 1990, No. 23, pp. 4494-4496.
Article: Furukawa et al., "Optical Properties of Silicon Network Polymers", Macromolecules, 1990, No. 23, pp. 3423-3426.
Article: Manning et al., "The Systematic Synthesis of Complexes Containing . . . ", J. Chem. Soc., Chem. Commun., 1992, pp. 897-898.
Handbook: Walter Noll, "Chapter 5—Preparation of Polyorganosiloxanes", Chemistry and Technology of Silicones, 1968, pp. 190-245.
English language abstract for JP 03-047567 extracted from PAJ database, Aug. 4, 2011, 1 pages.
Article: Nametkin et al., "Polymerization of Silacyclobutane Monomers Catalyzed by Halides of Variable Valence Metals", A.V. Topchiev Institute of Petrochemical Synthesis, 1973, vol. 208, No. 5, pp. 128-131.
Article: Dunogues et al., "New Polycarbosilane Models. 1. Poly [(methylchlorosilylene) methylene], a Novel, Functional Polycarbosilane", Macromolecules, 1988, No. 21, pp. 30-34.
Article: Delgado et al., "Contrasting One- and Two-Cation Binding Behavior in syn- and anti-Anthraquinone Bibracchial Podand (BiP) . . . ", Journal of American Chemical Society, 1988, No. 110, pp. 119-124.
Article: Sakamoto et al., "Highly Ordered High Molecular Weight Alternating Polysilylene Copolymer Prepared by Anionic Polymerization of Masked Disilene (fn. 1)" Macromolecules, 1990, No. 23, pp. 4494-4496.
English language abstract and machine-assisted English translation for JP 10-212358 extracted from the PAJ database on Dec. 26, 2012, 37 pages.
English language abstract and translation for JP 2007-112693 extracted from the PAJ database on Sep. 14, 2012, 44 pages.
English language abstract and machine-assisted English translation for JP 10-175816 extracted from the PAJ database on Mar. 7, 2013, 43 pages.
English language abstract for JP 6055897 extracted from the espacenet.com database on Mar. 7, 2013, 10 pages.
English language abstract not available for JP 62201933; however, see English language equivalent US 4,639,501. Original document extracted from the espacenet.com database on Mar. 7, 2013, 31 pages.
English language abstract and machine-assisted English translation for JP 2007-294422 extracted from the PAJ database on Mar. 7, 2013, 55 pages.

* cited by examiner

SILICON-CONTAINING PARTICLES, METHOD FOR MANUFACTURING THEREOF, OIL COMPOSITION, CERAMIC MATERIAL, AND METHOD FOR MANUFACTURING THEREOF

RELATED APPLICATIONS

This application claims priority to and all the advantages of International Patent Application No. PCT/JP2009/057413, filed on Apr. 6, 2009, which claims priority to Japanese Patent Application No. JP2008-119361, filed on Apr. 30, 2008, and Japanese Patent Application No. JP2009-046410, filed on Feb. 27, 2009.

TECHNICAL FIELD

The present invention relates to a method for manufacturing silicon-containing particles, particles manufactured by the aforementioned method, an oil composition containing the aforementioned particles, a method for manufacturing a ceramic material with the use of the aforementioned particles, and a ceramic material manufactured by the aforementioned method.

BACKGROUND ART

Silicon-containing particles represented by silicone rubber particles are used as a raw material for cosmetic products, an additive to organic resins, etc. A known method of manufacturing the silicon-containing particles consists of curing a curable silicone composition in a state emulsified in an aqueous solution of a surface-active agent (hereinafter referred to as surfactant). For example, known in the art is a method of forming silicone rubber particles by emulsifying and curing a curable silicone composition that contains a non-cross-linkable silicone oil, thus obtaining silicone-rubber particles in oil droplets of the emulsion (see Japanese Unexamined Patent Application Publication (hereinafter referred to as "Kokai") 2000-281903).

However, silicon-containing particles manufactured by the method described above contain a large amount of surfactants. Therefore, such particles lose heat-resistant, electrical, and other properties that could be introduced by the silicon-containing particles per se. Furthermore, in the above method, control of the particle diameter by selecting types and concentrations of surfactants, or the emulsification capacity of the emulsifier, is applicable exclusively to particles of relatively large diameters, but control becomes more difficult the smaller is the diameter of the particles.

On the other hand, known in the art is a method of manufacturing a ceramic material that contains Si, O, and C by thermally decomposing a composition that includes a silicon-containing precursor (see Kokai H10-074506 and Kokai H10-275617) or by impregnating graphite with one or more kinds of organic silicon compounds selected from cross-linkable silanes and siloxanes, forming a cross-linked product from the above organic silicon-containing compound in the graphite, and heating and reacting the graphite in a non-oxidative gas at 300 to 1200° C., thus obtaining a C/Si/O-based composite material (see Kokai 2003-171180).

However, when the ceramic materials obtained by the above methods are subjected to grinding for obtaining microparticles, the resulting fine particles are obtained in irregular shapes which do not provide desired flowability and filling properties that are inherent in fine spherical particles.

It is an object of the present invention to provide a method for manufacturing silicon-containing particles of an extremely small diameter in a simple process without the use of surfactants, or the like. It is another object to provide silicon-containing particles that can be produced with a controlled diameter, possess excellent dispersibility in oil, and which provide a high degree of ceramification upon baking. The invention also provides an oil composition with uniformly dispersed silicon-containing particles.

It is a further object of the invention to provide a method for manufacturing a ceramic material composed of particles of an extremely small and controllable diameter in a simple process. It is a still further object to provide a ceramic material that possesses the above-mentioned properties.

DISCLOSURE OF INVENTION

The method of the invention for manufacturing silicon-containing particles is characterized by preparing a uniform phase comprising at least a curable composition that includes a silicon-containing compound having in one molecule one or more reactive functional groups per 50 silicon atoms and an oil that does not participate in curing the composition, then curing the composition, and causing phase separation from the oil thereby obtaining the silicon-containing particles.

The silicon-containing particles of the invention are characterized by being obtained with the use of the above-described method.

The composition of the invention comprises at least the aforementioned silicon-containing particles and the oil.

The method of the invention for manufacturing the ceramic material is characterized by baking silicon-containing particles or a composition comprising the aforementioned oil and the silicon-containing particles, wherein the silicon-containing particles are obtained by preparing a uniform phase comprising at least a curable composition that includes a silicon-containing compound having in one molecule one or more reactive functional groups per 50 silicon atoms and an oil that does not participate in curing of the composition, then curing the composition, and causing phase separation from the oil.

The ceramic material of the invention is characterized by being obtained by the above-described method.

Effects of Invention

The method of the invention is characterized by manufacturing silicon-containing particles of extremely small diameter in a simple process without the use of surfactants, or the like. The silicon-containing particles of the invention are characterized by being produced by baking with a high degree of ceramification, having a controlled diameter, and possessing excellent dispersibility in oil. The oil composition of the invention is characterized by excellent feel of touch.

The method of the invention for manufacturing the ceramic material is characterized by producing the ceramic material composed of particles having a small controllable diameter, the particles being produce in a simple process. The ceramic material of the invention is characterized by containing extremely small particles that have small diameter and small size distribution.

DETAILED DESCRIPTION OF THE INVENTION

Figure 1:
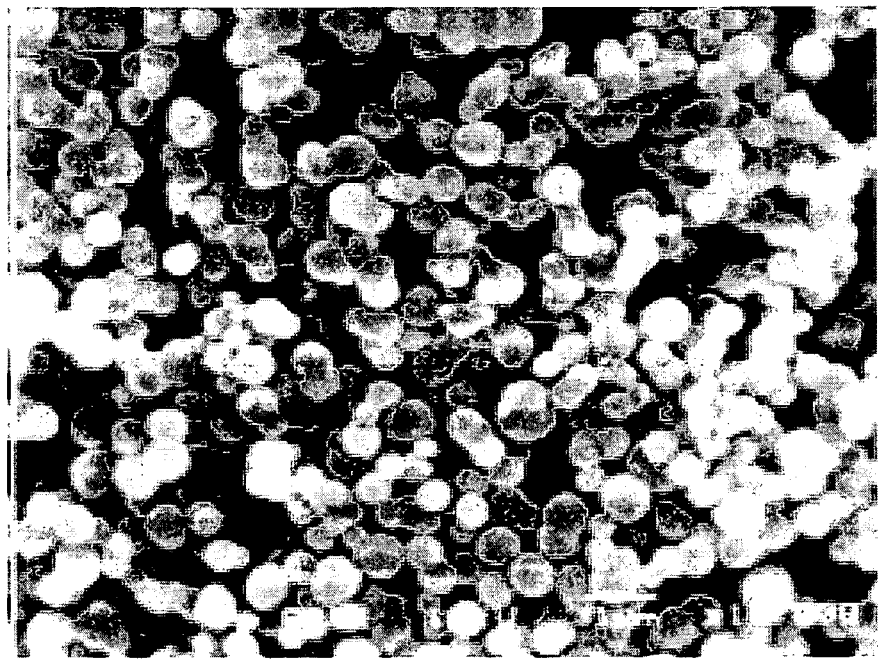
FIG. 1 is an electron microscope photograph of silicon-containing particles obtained in Practical Example 1.
Figure 2:
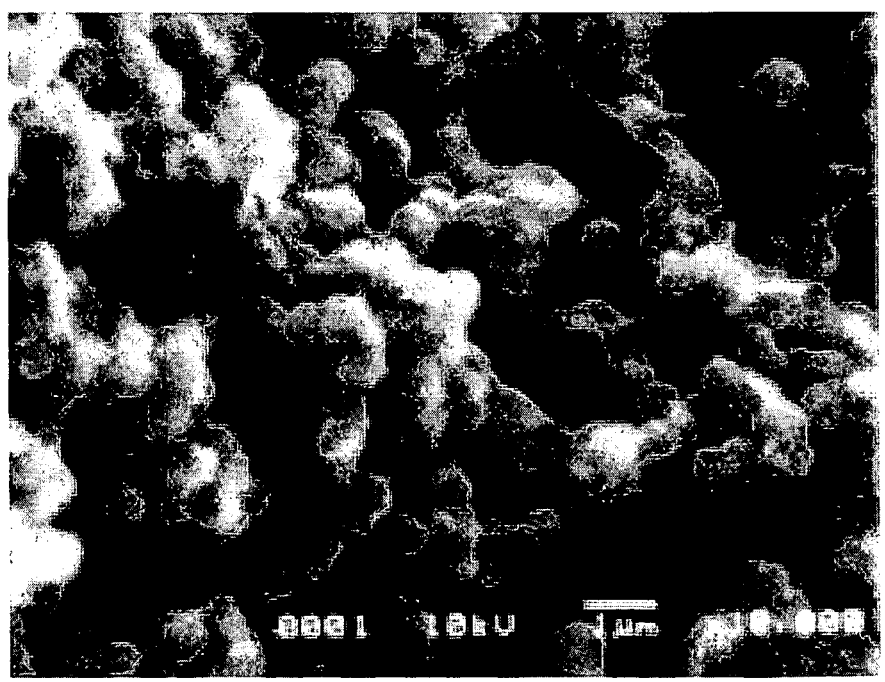
FIG. 2 is an electron microscope photograph of a ceramic material obtained by baking an oil composition that contains the silicon-containing particles obtained in Practical Example 1.
Figure 3:
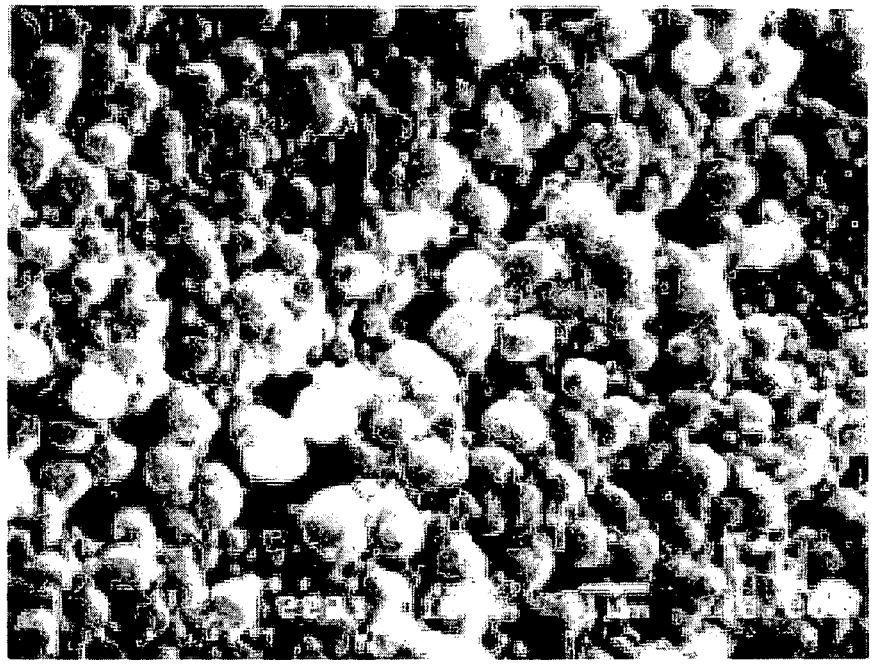
FIG. 3 is an electron microscope photograph of silicon-containing particles obtained in Practical Example 4.
Figure 4:
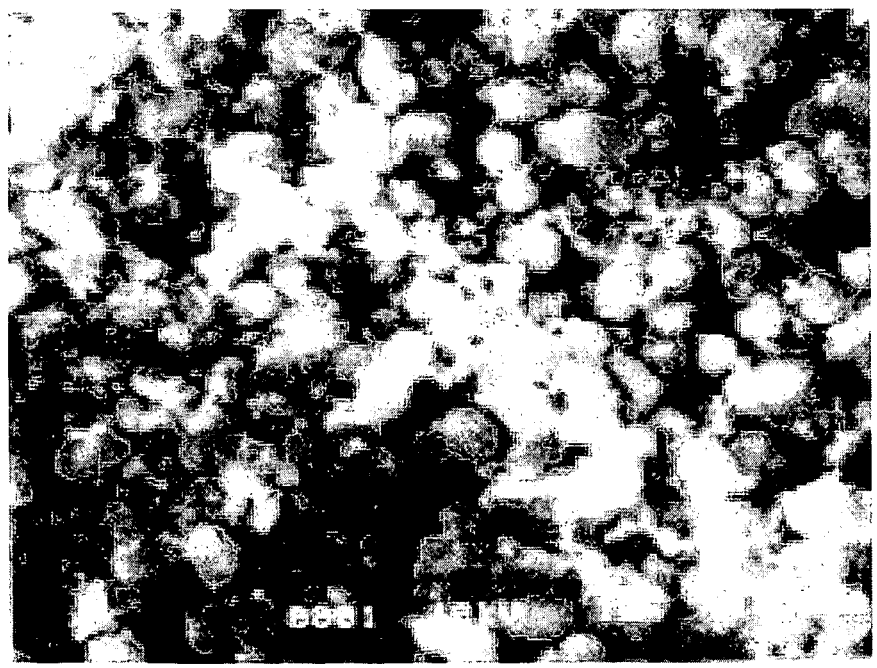
FIG. 4 is an electron microscope photograph of a ceramic material obtained by baking the silicon-containing particles obtained in Practical Example 4.
Figure 5:
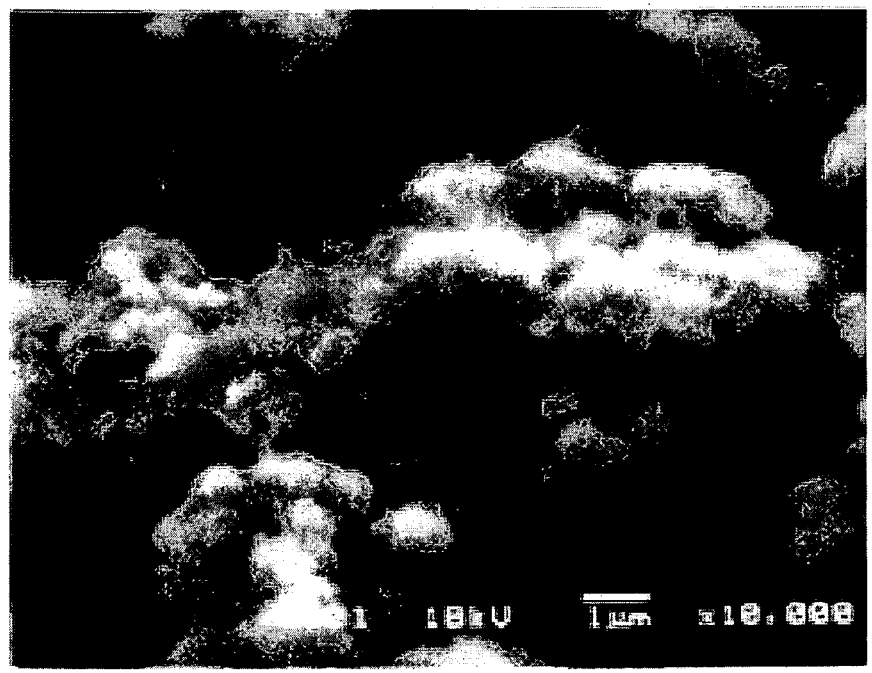
FIG. 5 is an electron microscope photograph of a ceramic material obtained by baking an oil composition that contains the silicon-containing particles obtained in Practical Example 4.
Figure 6:
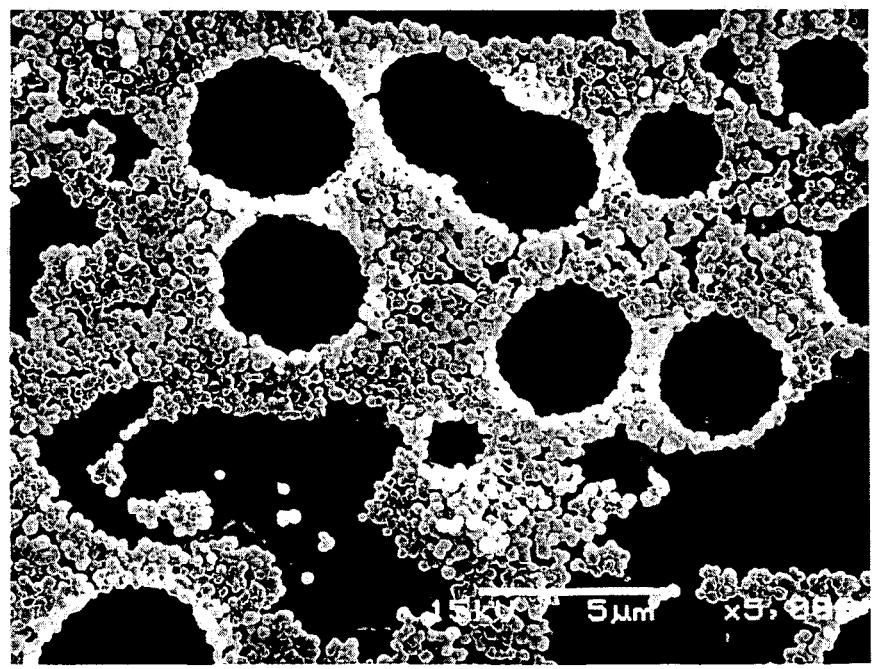
FIG. 6 is an electron microscope photograph of silicon-containing particles obtained in Practical Example 12.
Figure 7:
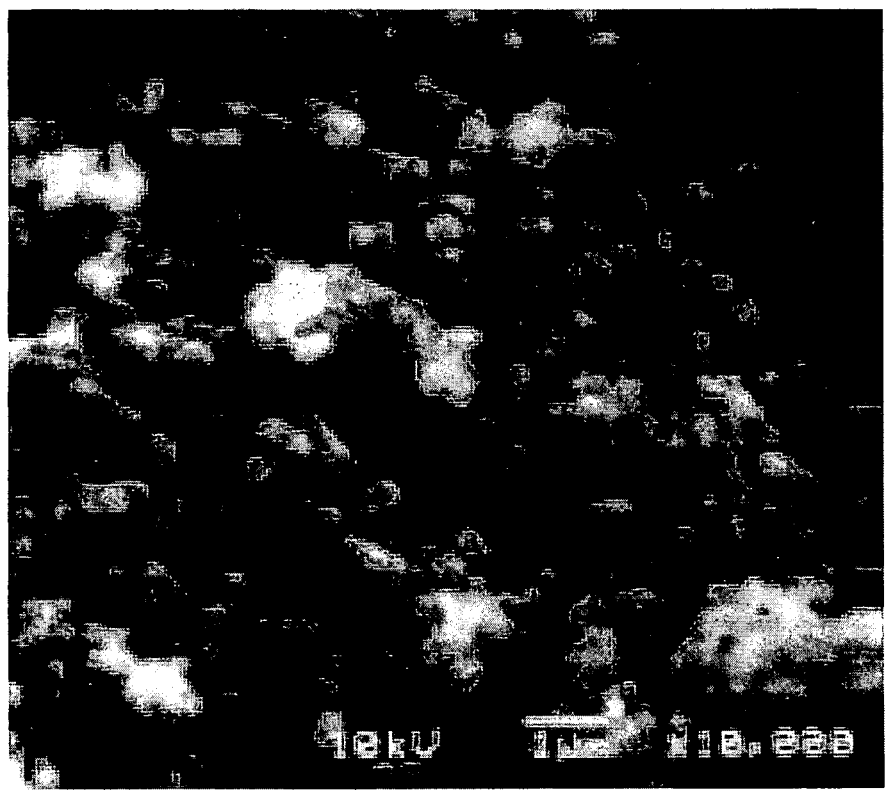
FIG. 7 is an electron microscope photograph of silicon-containing particles obtained in Practical Example 13.

The method of the invention for manufacturing silicon-containing particles is characterized by preparing a uniform phase comprising a curable composition that includes a silicon-containing compound having in one molecule one or more reactive functional groups per 50 silicon atoms and an oil that does not participate in curing the composition, then curing the composition, and causing phase separation from the oil thereby obtaining the silicon-containing particles. The oil is a component that in the initial stage of the curing reaction is compatibilized with the composition that includes the silicon-containing compound, while further curing of the mixture induces separation of phases, whereby silicon-containing particles are obtained. There are no special restrictions with regard to the type of the aforementioned oil provided that it practically does not participate in curing of the composition that contains the silicon compound, is compatible with the composition in the initial stage of curing, and lose compatibility with the product after curing. In other words, in case when curing of the curable composition that incorporates the silicon-containing compound requires heating, and the oil readily forms a uniform phase already at the temperature of the initial stage of curing, there is no need in forming a uniform phase at temperature before curing.

The silicon-containing compound is a compound that, when cured forms silicon-containing particles and that contains in one molecule one or more reactive functional groups per 50 silicon atoms, and preferably contains one or more reactive functional groups per 25 silicon atoms. Such functional groups may comprise, e.g., addition-reactive groups, condensation-reactive groups, ring-opening reactivey groups, or radical-reactivite groups. The addition-reactive groups may be represented by silicon-bonded hydrogen atoms; vinyl, allyl, propenyl, hexenyl, or similar alkenyl groups; or mercapto-containing organic groups. The condensation reactive groups may be represented by methoxy, ethoxy, propoxy, or similar silicon-containing alkoxy groups; silicon-bonded hydroxy groups, silicon-bonded halogen atoms, or amino-containing organic groups. The ring-opening reactive groups can be exemplified by 3-glycidoxypropyl, or similar glycidoxyalkyl groups; 2-(3,4-epoxycyclohexyl) ethyl groups, or similar epoxycycloalkyl groups, or other epoxy-containing organic groups. The radical-reactive groups can be represented by vinyl, allyl, propenyl, hexenyl, or similar alkenyl groups; 3-acryloxypropyl, or similar acryl-containing organic groups; or 3-methacryloxypropyl, or other methacryl-containing organic groups.

The silicon-containing compounds may be compounds selected from the group consisting of siloxanes, silanes, silazanes, carbosilanes, and mixtures thereof. Specific examples are the following: monomers, oligomers, or polymers and other siloxanes that contain Si—O—Si bonds; silanes, disilanes, oligomers, and polymers, or other silanes that contain Si—Si bonds; monomers, oligomers, and polymers, or other silalkylenes that contain Si—$(CH_2)_m$—Si bonds; monomers, oligomers, or polymer, and other silarylenes that contain Si—$(C_6H_4)_m$—Si bonds; monomers, oligomers, or polymers and other silazanes that contain Si—N—Si bonds; silicon-containing compounds that contain at least two of the following bonds: Si—O—Si, Si—Si, Si—$(CH_2)_m$—Si, Si—$(C_6H_4)_m$—Si, and Si—N—Si; or mixture of the above compounds. In the above formulae, "m" is an integer equal to or greater than 1.

The siloxane compounds can be represented, e.g., by the following average unit formula:

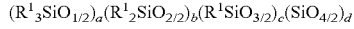

$(R^1{}_3SiO_{1/2})_a(R^1{}_2SiO_{2/2})_b(R^1SiO_{3/2})_c(SiO_{4/2})_d$ wherein $R^1$ designates identical or different, substituted or unsubstituted monovalent hydrocarbon groups, hydrogen atoms, halogen atoms, epoxy-containing organic groups, acryl-containing organic groups, methacryl-containing organic groups, amino-containing organic groups, mercapto-containing organic groups, alkoxy groups, or hydroxy groups; "a", "b", "c", and "d" are numbers, which may be equal to or greater than 0 and equal to or less than 1 and which satisfy the following condition: (a+b+c+d)=1; however, "a", "b", and "c" cannot be equal to 0 at the same time.

The monovalent hydrocarbon group designated by $R^1$ can be exemplified by an alkyl, alkenyl, aralkyl, or an aryl group. The alkyl group may have 1 to 12 carbon atoms and preferably should have 1 to 6 carbon atoms. The alkyl group may be represented by any of the following groups: a linear-chain or a partially branched linear-chain alkyl group, a cycloalkyl group, or a cycloalkylene group [a linear-chain or a partially branched linear chain alkylene group (preferably a methylene group, ethylene group, or another alkylene group having 1 to 6 carbon atoms) in combination with a carbocyclic ring (preferably one with 3 to 8 carbon atoms)]. The linear-chain or partially branched linear-chain alkyl group may comprise a linear-chain or a partially branched linear-chain alkyl group having 1 to 6 carbon atoms, such as a methyl, ethyl, n-propyl, isopropyl, butyl, t-butyl, pentyl, or hexyl group. The cycloalkyl group may comprise one with 4 to 6 carbon atoms, such as a cyclobutyl, cyclopentyl, or cyclohexyl group. The alkenyl group may comprise one with 2 to 12 carbon atoms, preferably 2 to 6 carbon atoms. Such an alkenyl group with 2 to 6 carbon atoms may be exemplified by a vinyl, propenyl, butenyl, pentenyl, or hexenyl group, the preferable of which is a vinyl group. The aralkyl group may comprise one with 7 to 12 carbon atoms. Such an aralkyl group may be exemplified by a benzyl, phenethyl, or a phenylpropyl group. The aryl group may comprise one with 6 to 12 carbon atoms, such as a phenyl, naphthyl, or tolyl group. The aforementioned monovalent hydrocarbon group may have substituents, such as fluorine, chlorine, iodine, or similar halogen atoms; hydroxyl groups; methoxy groups, ethoxy groups, n-propoxy groups, and isopropoxy groups, or similar alkoxy groups. The aforementioned substituted monovalent hydrocarbon groups can be exemplified by a 3-chloropropyl group, 3,3,3-trifluoropropyl group, perfluorobutylethyl group, or a perfluorooctylethyl group.

The halogen atoms designated by $R^1$ may be exemplified by chlorine, bromine, or iodine atoms. The chlorine atom is preferable.

The epoxy-containing organic groups designated by $R^1$ may be exemplified by a 3-glycidoxypropyl group, 4-glycidoxybutyl group, or a similar glycidoxyalkyl group; 2-(3,4-epoxycyclohexyl)ethyl group, 3-(3,4-epoxycyclohexyl) propyl group, or a similar epoxycyclohexyl-alkyl group; a 4-oxiranylbutyl group, and 8-oxiranyloctyl group, or a similar oxylanylalkyl group. The glycidoxyalkyl group, and, especially the 3-glycidoxypropyl group, is preferable.

The acryl-containing organic groups designated by $R^1$ can be exemplified by a 3-acryloxypropyl group or a 4-acryloxybutyl group, of which the 3-acryloxypropyl group is preferable.

The methacryl-containing organic groups designated by $R^1$ can be exemplified by a 3-methacryloxypropyl group or a 4-methacryloxybutyl group, of which the 3-methacryloxypropyl group is preferable.

The amino-containing organic groups designated by $R^1$ can be exemplified by a 3-aminopropyl group, 4-aminobutyl, or an N-(2-aminoethyl)-3-aminopropyl group, of which the 3-aminopropyl group and N-(2-aminoethyl)-3-aminopropyl group are preferable.

The mercapto-containing organic groups designated by $R^1$ can be exemplified by a 3-mercaptopropyl group, or a 4-mercaptobutyl group.

The alkoxy groups designated by $R^1$ can be exemplified by methoxy, ethoxy, n-propoxy, or isopropoxy groups, of which the methoxy and ethoxy groups are preferable.

In one molecule, at least two groups designated by $R^1$ are alkenyl groups, hydrogen atoms, halogen atoms, epoxy-containing organic groups, acryl-containing organic groups, methacryl-containing organic groups, amino-containing organic groups, mercapto-containing organic groups, alkoxy groups, or hydroxy groups.

In the above formula, "a", "b", "c", and "d" are numbers, which may be equal to or greater than 0 and equal to or less than 1 and which satisfy the following condition: (a+b+c+d)=1; however, "a", "b", and "c" cannot be equal to 0 at the same time.

The aforementioned siloxanes may be structured at least from one of the units selected from $(R^1{}_3SiO_{1/2})$, $(R^1{}_2SiO_{2/2})$, $(R^1SiO_{3/2})$, and $(SiO_{4/2})$. Specific examples are the following: a linear-chain polysiloxane composed of $(R^1{}_3SiO_{1/2})$ and $(R^1{}_2SiO_{2/2})$ units; a cyclic polysiloxane composed of $(R^1{}_2SiO_{2/2})$ units; a branched-chain polysiloxane composed of $(R^1SiO_{3/2})$ units; a polysiloxane composed of $(R^1{}_3SiO_{1/2})$ and $(R^1SiO_{3/2})$ units; a polysiloxane composed of $(R^1{}_3SiO_{1/2})$ and $(SiO_{4/2})$ units; a polysiloxane composed of $(R^1SiO_{3/2})$ and $(SiO_{4/2})$ units; a polysiloxane composed of $(R^1{}_2SiO_{2/2})$ and $(R^1SiO_{3/2})$ units; a polysiloxane composed of $(R^1{}_2SiO_{2/2})$ and $(SiO_{4/2})$ units; a polysiloxane composed of $(R^1{}_3SiO_{1/2})$, $(R^1{}_2SiO_{2/2})$, and $(R^1SiO_{3/2})$ units; a polysiloxane composed of $(R^1{}_3SiO_{1/2})$, $(R^1{}_2SiO_{2/2})$, and $(SiO_{4/2})$ units; a polysiloxane composed of $(R^1{}_3SiO_{1/2})$, $(R^1SiO_{3/2})$, and $(SiO_{4/2})$ units; a polysiloxane composed of $(R^1{}_2SiO_{2/2})$, $(R^1SiO_{3/2})$, and $(SiO_{4/2})$ units; and a polysiloxane composed of $(R^1{}_3SiO_{1/2})$, $(R^1{}_2SiO_{2/2})$, $(R^1SiO_{3/2})$, and $(SiO_{4/2})$ units. It is recommended that in one molecule a repeating number of the $(R^1{}_3SiO_{1/2})$, $(R^1{}_2SiO_{2/2})$, $(R^1SiO_{3/2})$, and $(SiO_{4/2})$ units be in the range of 1 to 10,000, preferably, 1 to 1,000, and most preferably, 3 to 500.

The aforementioned siloxanes can be prepared by methods known in the art. There are no special restrictions with regard to the method for the siloxane preparation, but the most common method consists of hydrolysis of organochlorosilanes. This process is described, e.g., by Noll, in: *Chemistry and Technology of Silicones*, Chapter 5, Second Issue, translated from German, Academic Press, 1968. Furthermore, U.S. Pat. No. 4,618,666 and GB Patent No. 736, 971 disclose preparation of siloxanes that contain Si—O—Si and Si—Si bonds.

Apart from Si—O—Si bonds, the aforementioned siloxanes may have Si—Si bonds, Si—N—Si bonds, Si—$(CH_2)_m$—Si bonds, Si—$(C_6H_4)_m$—Si bonds, etc. In these formulae, "m" may be the same as mentioned above.

The silanes are represented by the following general formula:

$$R^1{}_4Si$$

or by the following average unit formula:

$$(R^1{}_3Si)_a(R^1{}_2Si)_b(R^1Si)_c(Si)_d$$

wherein $R^1$ designates identical or different, substituted or unsubstituted monovalent hydrocarbon groups, hydrogen atoms, halogen atoms, epoxy-containing organic groups, acryl-containing organic groups, methacryl-containing organic groups, amino-containing organic groups, mercapto-containing organic groups, alkoxy groups, or hydroxy groups; however, in one molecule at least one group designated by $R^1$ is an alkenyl group, hydrogen atom, halogen atom, an epoxy-containing organic group, an acryl-containing organic group, a methacryl-containing organic group, an amino-containing organic group, a mercapto-containing organic group, an alkoxy group, or a hydroxy group; "a", "b", "c", and "d" are numbers, which may be equal to or greater than 0 and equal to or less than 1 and which satisfy the following condition: (a+b+c+d)=1; however, "a", "b", and "c" cannot be equal to 0 at the same time. In the above formula, $R^1$, "a", "b", and "c" are the same as defined above.

The silanes are defined by the general formula: $R^1{}_4Si$, or structured from at least one of the units selected from $(R^1{}_3Si)$, $(R^1{}_2Si)$, $(R^1Si)$, and $(Si)$. Specific examples are the following: a linear-chain polysilane composed of $(R^1{}_3Si)$ and $(R^1{}_2Si)$ units; a cyclic polysilane composed of $(R^1{}_2Si)$ units, a branched-chain polysilane (polysiline) composed of $(R^1Si)$ units; a polysilane composed of $(R^1{}_3Si)$ and $(R^1Si)$ units; a polysilane composed of $(R^1{}_3Si)$ and $(Si)$ units; a polysilane composed of $(R^1Si)$ and $(Si)$ units; a polysilane composed of $(R^1{}_2Si)$ and $(R^1Si)$ units; a polysilane composed of $(R^1{}_2Si)$ and $(Si)$ units; a polysilane composed of $(R^1{}_3Si)$, $(R^1{}_2Si)$, and $(R^1Si)$ units; a polysilane composed of $(R^1{}_3Si)$, $(R^1{}_2Si)$ and $(Si)$ units; a polysilane composed of $(R^1{}_3Si)$, $(R^1Si)$, and $(Si)$ units; a polysilane composed of $(R^1{}_2Si)$, $(R^1Si)$, and $(Si)$ units; or a polysilane composed of $(R^1{}_3Si)$, $(R^1{}_2Si)$, $(R^1Si)$, and $(Si)$. It is recommended that in one molecule a repeating number of the $(R^1{}_3Si)$, $(R^1{}_2Si)$, $(R^1Si)$, and $(Si)$ units be in the range of 2 to 10,000, preferably, 3 to 1,000, and most preferably, 3 to 500.

The aforementioned silanes can be manufactured by methods known in the art. For example, the method comprising dehalogenation of halosilanes in the presence of an alkali metal is described in the *Journal of American Chemical Society*, 11, 124 (1988); *Macromolecules*, 23, 3423 (1990), etc.; the method comprising anionic polymerization of disilenes is disclosed in *Macromolecules*, 23, 4494 (1990), etc.; the method comprising dehalogenation of halosilanes in the basis of electrode reduction is disclosed in *J. Chem. Soc., Chem. Commun.*, 1161 (1990); *J. Chem. Soc., Chem. Commun.*, 897 (1992); the method comprising dehalogenation of halosilanes in the presence of magnesium (see WO98/29476, etc.); dehydration of hydrosilanes in the presence of metal catalysts (see Kokai H4-334551, etc.), and other methods. Methods for preparation of silanes having Si—O—Si bonds are described, e.g., in U.S. Pat. No. 4,618,666 and GB736,971. A method for the preparation of silanes having Si—N—Si bonds is described, e.g., in U.S. Pat. No. 4,404,153, and a method for the preparation of silanes having Si—(C$_6$H$_4$)$_m$—Si bonds are described, e.g., in Kokai H3-47567.

Bonds of the aforementioned silane compounds other than Si—Si bonds may comprise Si—O—Si, Si—N—Si, Si—(CH$_2$)$_m$—Si, or Si—(C$_6$H$_4$)$_m$—Si bonds. In these formulae, "m" is the same as defined above.

The silazanes are represented by the following average unit formula:

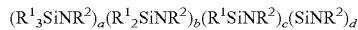

$$(R^1{}_3SiNR^2)_a(R^1{}_2SiNR^2)_b(R^1SiNR^2)_c(SiNR^2)_d$$

wherein R$^1$ designates identical or different, substituted or unsubstituted monovalent hydrocarbon groups, hydrogen atoms, halogen atoms, epoxy-containing organic groups, acryl-containing organic groups, methacryl-containing organic groups, amino-containing organic groups, mercapto-containing organic groups, alkoxy groups, or hydroxy groups; however, in one molecule at least one group designated by R$^1$ is an alkenyl group, hydrogen atom, halogen atom, an epoxy-containing organic group, an acryl-containing organic group, a methacryl-containing organic group, an amino-containing organic group, a mercapto-containing organic group, an alkoxy group, or a hydroxy group; R$^2$ designates hydrogen atoms, or substituted or unsubstituted monovalent hydrocarbon groups; "a", "b", "c", and "d" are numbers, which may be equal to or greater than 0 and equal to or less than 1 and which satisfy the following condition: (a+b+c+d)=1; however, "a", "b", and "c" cannot be equal to 0 at the same time.

In the above formula, R$^1$, "a", "b", "c", and "d" are the same as defined above. The monovalent hydrocarbon groups designated by R$^2$ are exemplified by the same groups as those designated by R$^1$. It is preferable that the groups designated by R$^2$ comprise hydrogen atoms or alkyl groups, especially hydrogen atoms or methyl groups.

The silazanes contain units selected from at least one of the following units: (R$^1{}_3$SiNR$^2$), (R$^1{}_2$SiNR$^2$), (R$^1$SiNR$^2$), and (SiNR$^2$). Specific examples are the following: a linear-chain polysilazane composed of (R$^1{}_3$SiNR$^2$) and (R$^1{}_2$SiNR$^2$) units; a cyclic polysilazane composed of (R$^1{}_2$SiNR$^2$) units, a branched-chain polysilazane composed of (R$^1$SiNR$^2$) units; a polysilazane composed of (R$^1{}_3$SiNR$^2$) and (R$^1$SiNR$^2$) units; a polysilazane composed of (R$^1{}_3$SiNR$^2$) and (SiNR$^2$) units; a polysilazane composed of (R$^1$SiNR$^2$) and (SiNR$^2$) units; a polysilazane composed of (R$^1{}_2$SiNR$^2$) and (R$^1$SiNR$^2$) units; a polysilazane composed of (R$^1{}_2$SiNR$^2$) and (SiNR$^2$) units; a polysilazane composed of (R$^1{}_3$SiNR$^2$), (R$^1{}_2$SiNR$^2$), and (R$^1$SiNR$^2$) units; a polysilazane composed of (R$^1{}_3$SiNR$^2$), (R$^1{}_2$SiNR$^2$) and (SiNR$^2$) units; a polysilazane composed (R$^1{}_3$SiNR$^2$), (R$^1$SiNR$^2$), and (SiNR$^2$); a polysilazane composed (R$^1{}_2$SiNR$^2$), (R$^1$SiNR$^2$), and (SiNR$^2$), and a polysilazane composed of (R$^1{}_3$SiNR$^2$), (R$^1{}_2$SiNR$^2$), (R$^1$SiNR$^2$), and (SiNR$^2$) units. It is recommended that in one molecule a repeating number of the (R$^1{}_3$SiNR$^2$), (R$^1{}_2$SiNR$^2$), (R$^1$SiNR$^2$), and (SiNR$^2$) units be in the range of 2 to 10,000, preferably, 3 to 1,000, and most preferably, 3 to 500.

The silazanes can be prepared by methods known in the art. Methods for manufacturing silazanes are disclosed, e.g., in U.S. Pat. Nos. 4,312,970; 4,340,619; 4,395,460; 4,404,153; 4,482,689; 4,397,828; 4,540,803; 4,543,344; 4,835,238; 4,774, 312; 4,929,742; and 4,916,200. Other information reported by Burns, et al. can be found in *J. Mater. Sci.*, 22 (1987), pp. 2609-2614. A method for the preparation of silazanes having Si—Si bonds is disclosed, e.g., in U.S. Pat. No. 4,404,153.

Bonds of the aforementioned silazane compounds other than Si—N—Si bonds may comprise Si—O—Si, Si—Si, Si—(CH$_2$)$_m$—Si, or Si—(C$_6$H$_4$)$_m$—Si bonds. In these formulae, "m" is the same as defined above.

The carbosilanes are represented by the following average unit formula:

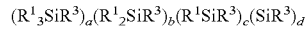

$$(R^1{}_3SiR^3)_a(R^1{}_2SiR^3)_b(R^1SiR^3)_c(SiR^3)_d$$

wherein R$^1$ designates identical or different, substituted or unsubstituted monovalent hydrocarbon groups, hydrogen atoms, halogen atoms, epoxy-containing organic groups, acryl-containing organic groups, methacryl-containing organic groups, amino-containing organic groups, mercapto-containing organic groups, alkoxy groups, or hydroxy groups; however, in one molecule at least one group designated by R$^1$ is an alkenyl group, hydrogen atom, halogen atom, an epoxy-containing organic group, an acryl-containing organic group, a methacryl-containing organic group, an amino-containing organic group, a mercapto-containing organic group, an alkoxy group, or a hydroxy group; R$^3$ designates alkylene groups or arylene groups; "a", "b", "c", and "d" are numbers, which may be equal to or greater than 0 and equal to or less than 1 and which satisfy the following condition: (a+b+c+d)=1; however, "a", "b", and "c" cannot be equal to 0 at the same time.

In the above formula, R$^1$, "a", "b", "c", and "d" are the same as defined above. The alkylene groups designated by R$^3$ may be exemplified, e.g., by a group of formula: —(CH$_2$)$_m$—. The arylene group designated by R$^3$ may be exemplified by a group of formula: —(C$_6$H$_4$)$_m$—.

The carbosilanes are structured from at least one of the units selected from the following: (R$^1{}_3$SiR$^3$), (R$^1{}_2$SiR$^3$), (R$^1$SiR$^3$), and (SiR$^3$). Specific examples are the following: a linear-chain polycarbosilane composed of (R$^1{}_3$SiR$^3$) and (R$^1{}_2$SiR$^3$) units, a cyclic polycarbosilane composed of (R$^1{}_2$SiR$^3$) units, a branched-chain polycarbosilane composed of (R$^1$SiR$^3$) units; a polycarbosilane composed of (R$^1{}_3$SiR$^3$) and (R$^1$SiR$^3$) units; a polycarbosilane composed of (R$^1{}_3$SiR$^3$) and (SiR$^3$) units; a polycarbosilane composed of (R$^1$SiR$^3$) and (SiR$^3$) units; a polycarbosilane composed of (R$^1{}_2$SiR$^3$) and (R$^1$SiR$^3$) units; a polycarbosilane composed of (R$^1{}_2$SiR$^3$) and (SiR$^3$) units; a polycarbosilane composed of (R$^1{}_3$SiR$^3$), (R$^1{}_2$SiR$^3$), and (R$^1$SiR$^3$) units; a polycarbosilane composed of (R$^1{}_3$SiR$^3$), (R$^1{}_2$SiR$^3$) and (SiR$^3$) units; a polycarbosilane composed of (R$^1{}_3$SiR$^3$), (R$^1$SiR$^3$), and (SiR$^3$) units; a polycarbosilane composed of (R$^1{}_2$SiR$^3$), (R$^1$SiR$^3$), and (SiR$^3$) units; or a polycarbosilane composed of (R$^1{}_3$SiR$^3$), (R$^1{}_2$SiR$^3$), (R$^1$SiR$^3$), and (SiR$^3$). It is recommended that in one molecule a repeating number of the (R$^1{}_3$SiR$^3$), (R$^1{}_2$SiR$^3$), (R$^1$SiR$^3$), and (SiR$^3$) units be in the range of 2 to 10,000, preferably, 3 to 1,000, and most preferably, 3 to 500.

The aforementioned carbosilanes can be prepared by methods known in the art. Methods for manufacturing carbosilanes are described, e.g., by J. Dunogues, et al. in: *Macromolecules*, 21, 3 (1988), in U.S. Pat. No. 3,293,194, by N. S, Nametkin, et al., in: *Doklady Akademii Nauk SSSR*, 28, 1112 (1973), by W. A. Kriner in: *J. Polym. Sci.*, Part. A-1. 4, 444 (1966), by N. S, Nametkin, et al. in: *Doklady Akademii Nauk SSSR*, 17, 188 (1966), and by C. S. Cundy, C. Eaborn, M. F. Lappert, in: *J. Organomet. Chem.*, 44(2), 291 (1972). Methods for manufacturing carbosilanes having Si—(C$_6$H$_4$)$_m$—Si bonds and Si—Si bonds are disclosed in Kokai H3-47567.

Bonds of carbosilanes other than the Si—(CH$_2$)$_m$—Si and Si—(C$_6$H$_4$)$_m$—Si bonds may be exemplified by Si—O—Si, Si—Si, and Si—N—Si bonds. In the above formulae, "m" is the same as defined above.

There are no special restrictions with regard to the forms of the above-described siloxanes, silanes, silazanes, and carbosilanes, which at room temperature may be in a solid, liquid, or paste-like form. In the manufacturing method of the invention, the use of the aforementioned siloxanes as curable silicon-containing compounds is preferable.

If in the method of the invention the silicon-containing compound cannot be cured alone or curing is too slow, it is recommended to add curing agents which are used in connection with the aforementioned silicon-containing compounds. For example, when one molecule of the silicon-containing compound contains at least two alkenyl groups, e.g., in case of siloxanes represented by the following average unit formula:

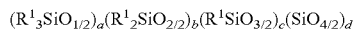

wherein $R^1$ designates identical or different, substituted or unsubstituted monovalent hydrocarbon groups, hydrogen atoms, halogen atoms, epoxy-containing organic groups, acryl-containing organic groups, methacryl-containing organic groups, amino-containing organic groups, mercapto-containing organic groups, alkoxy groups, or hydroxy groups; however, in one molecule at least two groups designated by $R^1$ are an alkenyl groups; "a", "b", "c", and "d" are numbers, which may be equal to or greater than 0 and equal to or less than 1 and which satisfy the following condition: (a+b+c+d)=1; however, "a", "b", and "c" cannot be equal to 0 at the same time, then the curing agent may comprise a combination of a hydrosilylation catalyst with a silicon-containing compound that contains in one molecule at least two silicon-bonded hydrogen atoms.

The alkenyl groups used in the silicon-containing compound can be exemplified by the same alkenyl groups which are designated by $R^1$. Vinyl groups are preferable. They may have a linear, branched, cyclic, net-like, or a partially branched linear molecular structure. The linear molecular structure is preferable. There are no special restrictions with regard to the form of the aforementioned silicon-containing compounds, which at 25° C. may be liquid or solid.

The silicon-containing compounds that contain in one molecule at least two silicon-bonded hydrogen atoms are siloxanes represented by the following average unit formula:

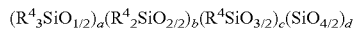

wherein $R^4$ designates identical or different, substituted or unsubstituted monovalent hydrocarbon groups, hydrogen atoms, alkoxy groups, or hydroxy groups; however, in one molecule at least two groups designated by $R^4$ are hydrogen atoms; "a", "b", "c", and "d" are numbers, which may be equal to or greater than 0 and equal to or less than 1 and which satisfy the following condition: (a+b+c+d)=1; however, "a", "b", and "c" cannot be equal to 0 at the same time.

Alternatively, the silicon-containing compound may be represented by the following general formula:

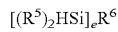

wherein $R^5$ designates identical or different, substituted or unsubstituted monovalent hydrocarbon groups, "e" is an integer equal to or greater than 2, and $R^6$ is an "e"-valent organic group.

In the first-mentioned siloxanes, the monovalent hydrocarbon groups that are designated by $R^4$ in the above formula of the first-mentioned siloxanes are exemplified by the same monovalent hydrocarbon groups which were defined earlier for $R^1$. The alkoxy groups designated by $R^4$ are the same as the respective alkoxy groups designated by $R^1$. However, in the aforementioned siloxanes, one molecule contains at least two groups designated by $R^4$, which are hydrogen atoms. Furthermore, a", "b", "c", and "d" are numbers, which may be equal to or greater than 0 and equal to or less than 1 and which satisfy the following condition: (a+b+c+d)=1; however, "a", "b", and "c" cannot be equal to 0 at the same time. Viscosity of these siloxanes at 25° C. may be in the range of 1 to 500,000 mPa·s, preferably in the range of 1 to 10,000 mPa·s.

The monovalent hydrocarbon groups that are designated by $R^5$ in the above formula of the second-mentioned silicon-containing compounds are exemplified by the same groups which were defined earlier for $R^1$; "e" is an integer, which is equal to or greater than 2, and which preferably is in the range of 2 to 6; $R^6$ is an "e"-valent organic group. If "e" is equal to 2, then the bivalent organic group represented by $R^6$ can be exemplified by alkylene, alkenylene, alkyleneoxyalkylene, arylene, aryleneoxyarylene, or arylene-alkylene-arylene groups. Specific examples of $R^6$ are represented by the following formulae:

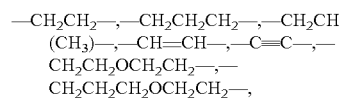

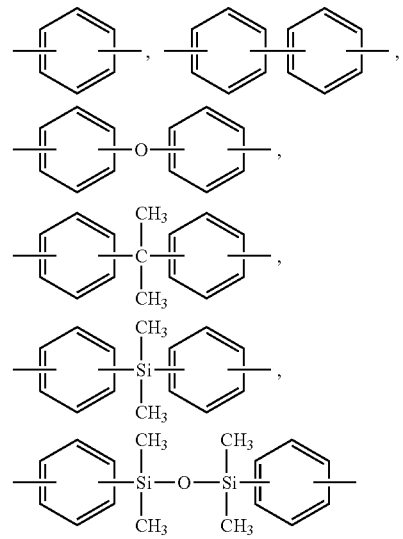

If "e" is equal to 3, then the trivalent organic group represented by $R^6$ can be exemplified by the following formulae:

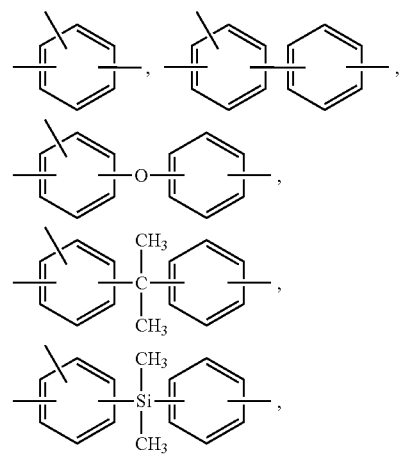

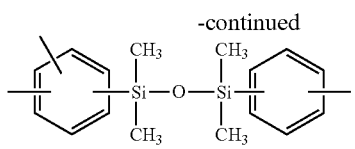

The silicon-containing compound that has in one molecule at least two silicon-bonded hydrogen atoms is added in such a quantity that the content of silicon-bonded hydrogen atoms contained in this component is in the range of 0.1 to 50 moles, preferably 0.1 to 30 moles, and most preferably 0.1 to 10 moles per one mole of the alkenyl groups in the silicon-containing compound having alkenyl groups. If this component is added in an amount less than the recommended lower limit, it will be difficult to form the silicon-containing particles. If, on the other hand, the added amount of the silicon-containing compound exceeds the recommended upper limit, this may lead to premature loss of physical properties of the silicon-containing particles.

The hydrosilylation catalyst can be exemplified by fine platinum powder, platinum black, fine platinum-carrying silica powder, fine platinum-carrying activated carbon, chloroplatinic acid, platinum tetrachloride, alcohol solution of chloroplatinic acid, platinum-olefin complex, or a platinum-alkenylsiloxane complex. There are no special restrictions with regard to the quantity in which the catalyst can be added. In the case of the silicon-containing compound that has alkenyl groups, it may be recommended to add the hydrosilylation catalyst, in terms of weight units, in an amount of 0.1 to 1,000 ppm, preferably 1 to 500 ppm, per weight of the compound.

If the silicon-containing compound has in one molecule at least two silicon-bonded hydrogen atoms, then a curing agent may comprise a combination of a compound having in one molecule at least two unsaturated aliphatic bonds with a hydrosilylation catalyst.

The compound having in one molecule at least two unsaturated aliphatic bonds may comprise the following: an aliphatic hydrocarbon compound having unsaturated aliphatic bonds on both molecular terminals and/or in the side molecular chains; an aliphatic hydrocarbon compound having hetero atoms in the molecular chains and unsaturated aliphatic bonds on both molecular terminals and/or in the side molecular chains; an aromatic hydrocarbon compound having in its molecule unsaturated aliphatic bonds; or a cyclic compound having in its molecule unsaturated aliphatic bonds and hetero atoms.

The aforementioned aliphatic hydrocarbon compounds can be represented by the following general formulae:

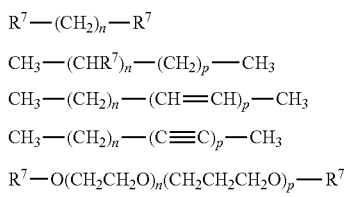

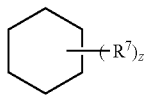

In the above formula, $R^7$ designates monovalent hydrocarbon groups having unsaturated aliphatic bonds. Specific examples of such groups are the following: vinyl, propenyl, butenyl, pentenyl, hexenyl, or similar alkenyl groups; acetyl, propynyl, pentynyl, or similar alkynyl groups. In the formulae, "n" and "p" are integers equal to or greater than 1; and "z" is an integer in the range of 2 to 6.

The aromatic compounds can be represented by the following formula:

In this formula, $R^7$ designates monovalent hydrocarbon groups that have unsaturated aliphatic bonds and can be exemplified by the same groups as defined above; "w" is an integer equal to or greater than 2. When "w" is equal to 2, $R^8$ is a bivalent aromatic hydrocarbon group. Specific examples are the following:

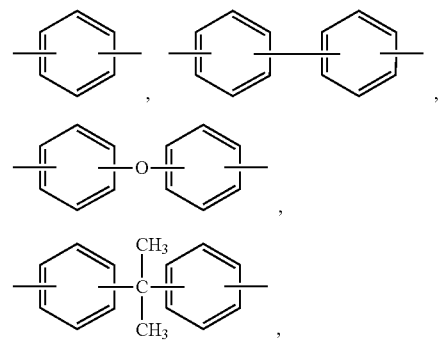

When "w" is equal to 3, $R^8$ is a trivalent aromatic hydrocarbon group. Specific examples are the following:

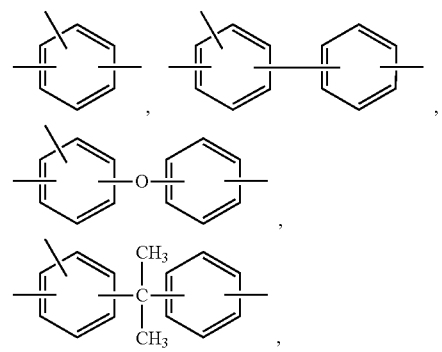

The aromatic hydrocarbon compounds that contain hetero atoms can be represented, e.g., by the following formula:

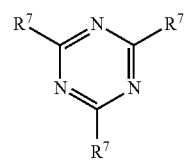

In this formula, $R^7$ designates monovalent hydrocarbon groups having unsaturated aliphatic bonds. These groups are the same as define for $R^7$ above.

The cyclic compounds that contain hetero atoms can be represented, e.g., by the following formula:

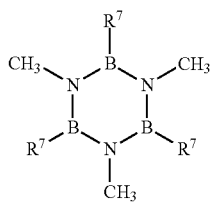

In this formula, $R^7$ designates monovalent hydrocarbon groups having unsaturated aliphatic bonds. These groups are the same as define for $R^7$ above.

Furthermore, when a molecule of the silicon-containing compound contains at least two silicon-bonded hydroxy groups, e.g., when the siloxane is represented by the following average unit formula:

$$(R^1{}_3SiO_{1/2})_a(R^1{}_2SiO_{2/2})_b(R^1SiO_{3/2})_c(SiO_{4/2})_d$$

wherein $R^1$ designates identical or different, substituted or unsubstituted monovalent hydrocarbon groups, hydrogen atoms, halogen atoms, epoxy-containing organic groups, acryl-containing organic groups, methacryl-containing organic groups, amino-containing organic groups, mercapto-containing organic groups, alkoxy groups, or hydroxy groups; however, in one molecule at least two groups designated by $R^1$ are hydroxy groups; "a", "b", "c", and "d" are numbers, which may be equal to or greater than 0 and equal to or less than 1 and which satisfy the following condition: (a+b+c+d)=1; however, "a", "b", and "c" cannot be equal to 0 at the same time, then the curing agent may comprise a combination of the aforementioned silicon-containing compound that contains in one molecule at least two silicon-bonded hydrogen atoms with a condensation-reaction catalyst.

The aforementioned silicon-containing compound may have a linear, branched, cyclic, network-like, or partially branched linear molecular structure, of which the linear molecular structure is preferable. Such a silicon-containing compound may have a viscosity at 25° C. in the range of 1 to 500,000 mPa·s, preferably 1 to 100,000 mPa·s.

The silicon-containing compound that has in one molecule at least two silicon-bonded hydrogen atoms can be exemplified by the same compounds as mentioned earlier. Such a silicon-containing compound with silicon-bonded hydrogen atoms can be added in an amount of 0.1 to 10 parts by weight, preferably 0.1 to 5 parts by weight per 100 parts by weight of the aforementioned silicon-containing compound with silicon-bonded hydroxy groups.

The condensation catalyst may be represented by tin naphthenate, stannous caprylate, tin oleate, tin oxalate, titanium naphthenate, zinc naphthenate, cobalt naphthenate, zinc stearate, butyl tin-tri-2-ethylhexoate, dibutyl tin diacetate, dibutyl tin dilaurate, dibutyl tin dioctate, dibutyl tin diolate, lead 2-ethylhexoate, zinc 2-ethylhexoate, or similar metal carboxylates; tetrabutyl titanate, tetra-2-ethylhexyl titanate, tetraoctadecyl titanate, tetraphenyl titanate, tetra(isopropenyloxy) titanate, or a similar organic titanium acid ester.

The aforementioned condensation-reaction catalyst is an arbitrary component, which can be used in an amount not exceeding 5 parts by weight per 100 parts by weight of the aforementioned silicon-containing compound with silicon-bonded hydroxy groups.

If the silicon-containing compound contains in one molecule at least two silicon-bonded alkoxy groups or hydroxy groups, e.g., if this compound is represented by the following average unit formula:

$$(R^1{}_3SiO_{1/2})_a(R^1{}_2SiO_{2/2})_b(R^1SiO_{3/2})_c(SiO_{4/2})_d$$

wherein $R^1$ designates identical or different, substituted or unsubstituted monovalent hydrocarbon groups, hydrogen atoms, halogen atoms, epoxy-containing organic groups, acryl-containing organic groups, methacryl-containing organic groups, amino-containing organic groups, mercapto-containing organic groups, alkoxy groups, or hydroxy groups; however, in one molecule at least two groups designated by $R^1$ are alkoxy or hydroxy groups; "a", "b", "c", and "d" are numbers, which may be equal to or greater than 0 and equal to or less than 1 and which satisfy the following condition: (a+b+c+d)=1; however, "a", "b", and "c" cannot be equal to 0 at the same time, then the curing agent may comprise a hydrolysable silane of the following formula:

$$(R^9)_rSiX_{(4-r)}$$

or a product of partial hydrolysis and condensation of the hydrolysable silane (wherein $R^9$ designates substituted or unsubstituted monovalent hydrocarbon groups, epoxy-containing organic groups, epoxy-containing organic groups, acryl-containing organic groups, methacryl-containing organic groups, amino-containing organic groups, or mercapto-containing organic groups; X designates hydrolysable groups; and "r" is 0 or 1). These siloxanes are also combined with the condensation-reaction catalysts.

The alkoxy groups that are bonded to silicon in the silicon-containing compound may be exemplified by the same examples as the alkoxy groups earlier represented for $R^1$. The most preferable are methoxy and ethoxy groups. The aforementioned silicon-containing compound may have a linear, branched, cyclic, network-like, or partially branched linear molecular structure, of which the linear molecular structure is preferable. Such a silicon-containing compound may have a viscosity at 25° C. in the range of 1 to 500,000 mPa·s, preferably 1 to 100,000 mPa·s.

In the aforementioned hydrolysable silanes, the monovalent hydrocarbon groups designated by $R^9$ can be exemplified by the same monovalent hydrocarbon and alkenyl groups as those given for respective groups designated by $R^1$. The most preferable are alkyl groups. The epoxy-containing organic groups designated by $R^9$ can be exemplified by the same epoxy-containing organic groups as those given earlier for epoxy-containing groups designated by $R^1$. The acryl-containing organic groups designated by $R^9$ can be exemplified by the same acryl-containing organic groups as those given earlier for acryl-containing groups designated by $R^1$. The methacryl-containing organic groups designated by $R^9$ can be exemplified by the same methacryl-containing organic groups as those given earlier for methacryl-containing groups designated by $R^1$. The amino-containing organic groups designated by $R^9$ can be exemplified by the same amino-containing organic groups as those given earlier for amino-containing groups designated by $R^1$. The mercapto-containing organic groups designated by $R^9$ can be exemplified by the same mercapto-containing organic groups as those given earlier for mercapto-containing groups designated by $R^1$. In the above formula, "X" designates a hydrolysable group such as an alkoxy, acetoxy, aminoxy, or an oxime group; "x" is 0 or 1.

The aforementioned silanes or products of their partial hydrolysis and condensation may be exemplified by the following compounds: methylsilicate, ethylsilicate, methylcellosolve-orthosilicate, n-propyl-orthosilicate, or similar alkylsilicates; methyl-trimethoxysilane, ethyl-trimethoxysilane, methyl-triethoxysilane, vinyl-trimethoxysilane, aminomethyl-triethoxysilane, 3-aminopropyl-triethoxysilane, 3-aminopropyl-methyldimethoxysilane, N-(2-aminoethyl)aminomethyl-tributhoxysilane, N-(2-aminoethyl)-3-aminopropyl-trimethoxysilane, N-(2-aminoethyl)-3-aminopropyl-methyldimethoxysilane, 3-anilinopropyl-triethoxysilane, 3-glycidoxypropyl-trimethoxysilane, 3-glycidoxypropyl-methyldimethoxysilane, 2-(3,4-epoxycyclohexyl)-ethyltrimethoxysilane, 2-(3,4-epoxycyclohexyl)ethylmethyl-dimethoxysilane, or similar alkoxysilanes; methyltriacetoxysilane, ethyltriacetoxysilane, vinyltriacetoxysilane, or similar acetoxysilanes; methyl-tris(dimethylketoximino) silane, methyl-tris(methylethylketoximino) silane, methyl-tris(methylpropylketoximino) silane, methyl-tris(methylisobutylketoximino) silane, ethyl-tris(dimethylketoximino) silane, ethyl-tris(methylethylketoximino) silane, ethyl-tris(methylpropylketoximino) silane, ethyl-tris(methylisobutylketoximino) silane, vinyl-tris(dimethylketoximino) silane, vinyl-tris(methylethylketoximino) silane, vinyl-tris(methylpropylketoximino) silane, vinyl-tris(methylisobutylketoximino) silane, tetrakis(dimethylketoximino) silane, tetrakis(methylethylketoximino) silane, tetrakis(methylpropylketoximino) silane, and tetrakis(methylisobutylketoximino) silane or similar ketoximinosilanes.

It is recommended to add the aforementioned hydrolysable silane or the product of its partial hydrolysis is added in an amount of 0.1 to 10 parts by weight, preferably 0.1 to 5 parts by weight per 100 parts by weight of the aforementioned silicon-containing compound with silicon-bonded alkoxy groups or hydroxy groups.

The condensation-reaction catalyst is the same as defined above. Although the use of the condensation-reaction catalyst is optional, it may be recommended to add the catalyst in an amount not exceeding 5 parts by weight per 100 parts by weight of the aforementioned silicon-containing compound with silicon-bonded alkoxy groups or hydroxy groups.

If the silicon-containing compounds contain in one molecule at least one epoxy-containing organic group, e.g., if these compounds are siloxanes represented by the following average unit formula:

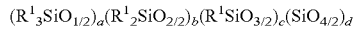

$(R^1_3SiO_{1/2})_a(R^1_2SiO_{2/2})_b(R^1SiO_{3/2})_c(SiO_{4/2})_d$ wherein $R^1$ designates identical or different, substituted or unsubstituted monovalent hydrocarbon groups, alkenyl groups, hydrogen atoms, halogen atoms, epoxy-containing organic groups, acryl-containing organic groups, methacryl-containing organic groups, amino-containing organic groups, mercapto-containing organic groups, alkoxy groups, or hydroxy groups; however, in one molecule at least one group designated by $R^1$ is an epoxy group; "a", "b", "c", and "d" are numbers, which may be equal to or greater than 0 and equal to or less than 1 and which satisfy the following condition: (a+b+c+d)=1; however, "a", "b", and "c" cannot be equal to 0 at the same time), then the curing agent may be one normally used for curing epoxy resins.

The epoxy-containing organic groups of the silicon-containing compound may be exemplified by the epoxy-containing organic groups which are designated by $R^1$. Glycidoxyalkyl groups are preferable. The aforementioned silicon-containing compound may have a linear, branched, cyclic, network-like, or partially branched linear molecular structure, of which the linear molecular structure is preferable. There are no special restrictions with regard to the viscosity of these silicon-containing compounds and it may be liquid or solid at 25° C.

The curing agent for epoxy resins may be represented by anhydrides; phenol compounds; amine compounds; metal organic compounds of aluminum, zirconium, or another metal; phosphines, or similar organic phosphine compounds; boron complexes; organic ammonium salts, organic sulfonium salts, or similar onium salts.

The anhydrides may be represented by a succinic anhydride, maleic anhydride, itaconic anhydride, octenyl succinic anhydride, dodecenyl succinic anhydride, phthalic anhydride, tetrahydrophthalic anhydride, hexahydrophthalic anhydride, methyltetrahydrophthalic anhydride, methylhexahydrophthalic anhydride, tetrabromophthalic anhydride, himic anhydride, methyl nadic anhydride, dodecyl succinic anhydride, chlorendic anhydride, trialkyltetrahydrophthalic anhydride, diphenic anhydride, pyromellitic anhydride, benzophenone-tetracarboxylic anhydride, ethyleneglycol bis(anhydrotrimate), methylcyclohexane-tetracarboxylic anhydride, biphenyl-tetracarboxylic anhydride, diphenylether-tetracarboxylic anhydride, butane-tracarboxylic dianhydride, cyclopentane-tetracarboxylic anhydride, benzophenone-tetracarboxylic anhydride, bicycle-[2,2,2]-octo-7-ene-2,3,5,6-tetracarboxylic anhydride, β,γ-aconic anhydride, glycolic anhydride, trimellitic anhydride, or a polyazelaic anhydride.

The amine compounds may be exemplified by octylamine, ethylamine, hexylamine, dioctylamine, triethylamine, trihexylamine, triethylenetetramine, ethylene-diamine, dimethylethylene-diamine, benzyldimethyl-amine, α-methylbenzyldimethyl-amine, 1,8-diaza-bicyclo[5,4,0]undecene-7, or similar amines; aminoethyl-aminopropyl-methyldimethoxysilane, or similar aminosilanes; or amino-containing siloxane polymers.

The organic phosphorous compounds may be exemplified by triphenylphosphine, tributylphosphine, tri(p-methylphenyl) phosphine, tri(nonylphenyl) phosphine, triphenylphosphine-triphenylborate, or tetraphenylphosphine-tetraphenylborate.

The onium salts may comprise phosphonium salts, iodonium salts, sulfonium salts, etc. The phosphonium salts may be represented by benzyl triphenylphosphonium chloride, benzyl triphenylphosphonium bromide, benzyl triphenylphosphonium tetrafluoroborate, benzyl triphenylphosphonium hexafluoroantimonate, (p-butoxybenzyl)triphenylphosphonium bromide, (p-butoxybenzyl) triphenylphosphonium chloride, (p-methoxybenzyl) triphenylphosphonium chloride, (dimethylbenzyl) triphenylphosphonium bromide, (p-dimethylaminobenzyl) triphenylphosphonium chloride, (p-butoxybenzyl) triphenylphosphonium tetrafluoroborate, (p-butoxybenzyl) triphenylphosphonium hexafluoroantimonate, (p-butoxybenzyl)triphenylphosphonium tetrafluorobromide, (p-butoxybenzyl)triphenylphosphonium acetate, (p-butoxybenzyl)triphenylphosphonium tetra(perfluorophenyl) boride, (p-butoxybenzyl)triphenylphosphonium iodide, phenacyl triphenylphosphonium bromide, phenacyl triphenyl phosphonium chloride, ethoxycarbonylmethyl triphenyl phosphonium, napthalenylmethyl triphenyl phosphonium chloride, fluorenyl triphenyl phosphonium chloride, antracenylmethyltriphenyl phosphonium chloride, antracenylmethyltriphenyl phosphonium bromide, pyrenylmethyltriphenyl phosphonium bromide, or pyrenylmethyltriphenyl phosphonium chloride.

The iodinium salts may be represented by diphenyliodonium chloride, diphenyliodonium bromide, diphenyliodonium tetra(perfluorophenyl) boride, diphenyliodonium tetrafluoroboride, [phenyl-p-(2-hydroxytetradecyloxy)phenyl] iodonium hexafluoroantimonate, [phenyl-p-(2-hydroxytetradecyloxy)phenyl]iodonium chloride, [phenyl-p-

(2-hydroxytetradecyloxy)phenyl]iodonium bromide, [phenyl-p-(2-hydroxytetradecyloxy)phenyl]iodonium tetra (perfluorophenyl) boride, bis(p-dodecylphenyl) iodonium hexafluoroantimonate, bis(p-dodecylphenyl) iodonium chloride, bis(p-dodecylphenyl) iodonium bromide, bis(p-dodecylphenyl) iodonium tetrafluoroboride, bis(p-dodecylphenyl) iodonium tetra(perfluoroethyl) boride, bis(p-n-decyloxyphenyl)phenyliodonium hexafluoroantimonate, [p-(2-hydroxy-n-tetradecyloxy)phenyl]phenyliodonium trifluoromethane sulfonate, [p-(2-hydroxy-n-tetradecyloxy) phenyl]phenyliodonium hexafluorophosphate, [p-(2-hydroxy-n-tetradecyloxy)phenyl]phenyliodonium tetrakis (pentafluorophenyl) borate, bis(p-t-butylphenyl) iodonium hexafluoroantimonate, bis(p-t-butylphenyl) iodonium hexafluoroantimonate, bis(p-t-butylphenyl) iodonium trifluoromethane sulfonate, bis(p-t-butylphenyl) iodonium tetrafluoroborate, bis(dodecylphenyl) iodonium hexafluoroantimonate, bis(dodecylphenyl) iodonium tetrafluoroborate, bis (dodecylphenyl) iodonium hexafluoroantimonate, or bis (dodecylphenyl) iodonium trifluoromethane sulfonate.

The sulfonium salts can be represented by (p-butoxybenzyl) diphenylsulfonium bromide, (p-butoxybenzyl) diphenylsulfonium chloride, (p-butoxybenzyl) diphenylsulfonium tetrafluoborate, (p-butoxybenzyl) diphenylsulfonium hexafluoroantimonate, (p-butoxybenzyl) diphenylsulfonium tetraphenyl borate, (p-butoxybenzyl) diphenylsulfonium acetate, trimethylsulfonium iodide, diphenylmethylsulfonium tetrafluoroborate, diphenylmethylsulfonium iodide, dibenzylmethylsulfonium bromide, benzyldiphenylsulfonium chloride, benzyldodecylmethylsulfonium bromide, (3-methyl-2-butenyl)tetramethylenesulfonium iodide, (2-butenyl)tetramethylenesulfonium hexafluoroantimonate, methyloctylphenacylsulfonium bromide, benzylmethyloctylsulfonium bromide, or benzyldodecylmethylsulfonium iodide.

There are no special restriction with regard to the quantity in which the epoxy-resin-curing catalyst can be used, but it may be recommended to add this catalyst in an amount of 0.001 to 20 parts by weight per 100 parts by weight of the aforementioned silicon-containing compound.

If the silicon-containing compounds contain in one molecule at least one alkenyl group, acryl-containing organic group, or methacryl-containing organic group, e.g., if these compounds are siloxanes represented by the following average unit formula:

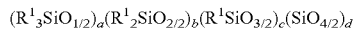

$(R^1{}_3SiO_{1/2})_a(R^1{}_2SiO_{2/2})_b(R^1SiO_{3/2})_c(SiO_{4/2})_d$ wherein $R^1$ designates identical or different, substituted or unsubstituted monovalent hydrocarbon groups, hydrogen atoms, halogen atoms, epoxy-containing organic groups, acryl-containing organic groups, methacryl-containing organic groups, amino-containing organic groups, mercapto-containing organic groups, alkoxy groups, or hydroxy groups; however, in one molecule at least one group designated by $R^1$ is an alkenyl group, an acryl-containing organic group, or a methacryl-containing organic group; "a", "b", "c", and "d" are numbers, which may be equal to or greater than 0 and equal to or less than 1 and which satisfy the following condition: (a+b+c+d)=1; however, "a", "b", and "c" cannot be equal to 0 at the same time, then the curing agent may comprise a radical initiator.

The alkenyl-, acryl-, or methacryl-containing organic groups may be represented by the same alkenyl-, acryl-, or methacryl-containing organic groups that were designated by $R^1$. The aforementioned silicon-containing compound may have a linear, branched, cyclic, network-like, or partially branched linear molecular structure, of which the linear molecular structure is preferable. There are no special restrictions with regard to the viscosity of these silicon-containing compounds and it may be liquid or solid at 25° C.

The radical initiator may comprise a peroxide-type polymerization initiator, an azo-type polymerization initiator, a photoinitiator, or a photosensitizer. The peroxide-type polymerization initiators may be exemplified, e.g., by dibenzoyl peroxide, bis-p-chlorobenzoyl peroxide, bis-2,4-dichlorobenzoyl peroxide, di-t-butylperoxide, dicumyl peroxide, t-butyl perbenzoate, 2,5-bis(t-butylperoxy)-2,3-dimethylhexane, t-butyl peracetate, benzoyl peroxide, bis(o-methylbenzoyl peroxide), bis(m-methylbenzoyl peroxide), bis(p-methylbenzoyl peroxide), 2,3-dimethylbenzoyl peroxide, 2,4-dimethylbenzoyl peroxide, 2,6-dimethylbenzoyl peroxide, 2,3,4-trimethylbenzoyl peroxide, 2,4,6-trimethybenzoylperoxide, or a similar substituted benzoylperoxide; t-butyl perbenzoate, 2,5-dimethyl-2,5-di(t-butylperoxy) hexane, t-butylperoxyisopropyl monocarbonate, t-butylperoxyacetate, or mixtures of the above compounds.

The azo-type polymerization initiators may be exemplified, e.g., by 2,2'-azobis-isobutylonitrile, or 2,2'-azobis(2,4-dimethylvaleronitrile).

The photoinitiators may be exemplified, e.g., by 2,2-dialkoxy-1,2-diphenylethan-1-one, 2-alkoxy-1,2-diphenylethane-1-one, or similar benzoin ether derivatives.

The photosensitizers may comprise benzyl or benzyl derivatives, aromatic diazonium salts, anthraquinone or anthraquinone derivatives, acetophenone or acetophenone derivatives, diphenyldisulfide, and benzophenone or benzophenone derivatives.

There are no special restrictions with regard to the amounts in which the radical initiators can be added, but it is recommended to add these components in an amount of 0.01 to 20 wt. % per weight of the silicon-containing compound, or in an amount of 0.1 to 20 parts by weight, preferably 0.1 to 10 parts by weight per 100 parts by weight of aforementioned component (A).

The oil is a component that in the initial stage of the curing reaction is compatibilized with the silicon-containing compound, while further curing induces separation of phases, whereby silicon-containing particles are obtained. There are no special restrictions with regard to the type of the aforementioned oil provided that it practically does not participate in curing the composition that contains the silicon compound, is compatible with the composition in the initial stage of curing, and lose compatibility with the product of curing. Also, there are no restrictions to the types of oil that can be used, and the oil may have a linear, partially branched linear, cyclic, or branched molecular structure, of which the linear or cyclic molecular structure is preferable. The oil may comprise a silicone oil, or an organic oil that does not contain silicon.

It is recommended that the silicone oil comprise one compatible with the curable silicone composition used for forming the silicon-containing particles. It is also recommended that during formation of the silicon-containing particles the aforementioned silicone oil does not participate in the curing reaction, and if the silicon-containing particles are subjected to a hydrosilylation reaction, molecules of the oil should not contain alkenyl groups or silicon-bonded hydrogen atoms. For example, this can be a dimethylpolysiloxane capped at both molecular terminals with trimethylsiloxy groups, a methylphenylpolysiloxane capped at both molecular terminals with trimethylsiloxy groups, a copolymer of a methylphenylsiloxane and a dimethylsiloxane capped at both molecular terminals with trimethylsiloxy groups, a copolymer of a methyl(3,3,3-trifluoropropyl) siloxane and a dimethylsiloxane capped at both molecular terminals with trimethylsiloxy groups, a cyclic dimethylsiloxane, or a cyclic methylphenylsiloxane. If the silicon-containing particles are subjected to a condensation reaction, then in addition to the silicone oils that do not contain in their molecules silanol groups, silicon-bonded hydrogen atoms, or silicon-bonded hydrolysable groups, other oils can be used, such as a dimethylpolysiloxane capped at both molecular terminals with dimethylvinylsiloxy groups, a copolymer of a methylvinylsiloxane and a dimethylsiloxane capped at both molecular terminals with dimethylvinylsiloxy groups, a methylvinylsiloxane capped at both molecular terminals with trimethylsiloxy groups, or a cyclic methylvinylsiloxane.

There are no special restrictions with regard to the viscosity of the silicone oil at 25° C., and it may be recommended to have the oil viscosity in the range of 1 to 100,000,000 mPa·s, preferably 2 to 10,000,000 mPa·s. If necessary, the above oils can be used in a mixture. Furthermore, the silicone-type oils may comprise modified silicone oils, such as silicone polymers modified with epoxy, acryl, or ethyl (ethyleneoxide or propyleneoxide).

There are no restrictions with regard to the type the organic oil, provided that this oil is compatible with the curable composition used for forming the silicon-containing particles. The organic oils may comprise aliphatic-type oil or an aromatic-type oil that has a linear, partially branched linear, cyclic, or branched molecular structure. An organic oil with a linear or cyclic molecular structure is preferable. The organic oil may possess volatility. It is recommended that during formation of the silicon-containing particles the organic oil does not participate in the curing reaction, and if the silicon-containing particles are subjected to hydrosilylation reaction, molecules of the oil should not contain alkenyl groups. The above-mentioned organic oils can be exemplified by carnauba wax, candelilla wax, Japan wax, whale wax, montan wax, beeswax, lanolin, and other waxes; dioctyl phthalate, hexyl laurate, isopropyl myristate, myristyl myristate, cetyl myristate, 2-octyldodecyl myristate, isopropyl palmitate, 2-ethylhexyl palmitate, butyl stearate, decyl oleate, 2-octyldodecyl oleate, myristyl lactate, cetyl lactate, lanolin acetate, stearyl alcohol, cetostearyl alcohol, oleyl alcohol, avocado oil, almond oil, olive oil, cacao butter, jojoba oil, sesame oil, safflower oil, soybean oil, camellia oil, squalane, persic oil, castor oil, mink oil, cotton oil, coconut oil, egg yolk oil, lard, or other oil and fats; polypropyleneglycol monooleate, neopentylglycol-2-ethylhexanoate, or similar glycolester oils; triglyceride isostearate, coconut oil fatty acid triglyceride, and other polyhydric alcohol ester oils; polyoxyethylene lauryl ether, polyoxypropylene cetyl ether, and other polyoxyalkylene ether oils.

The volatile organic oils can be represented by benzene, toluene, xylene, or similar aromatic hydrocarbons; hexane, cyclohexane, heptane, 2,2,4-trimethylpentane, octane, isoparaffin, or similar aliphatic hydrocarbons; acetone, methylethylketone, methylisobutylketone, or similar ketones; dimethylether, diethylether, dibutylether, tetrahydrofurane, 2,4-dioxane, or a similar ethers; butyl formate, methyl acetate, ethyl acetate, butyl acetate, ethyl propionate, cellosolve acetate, isopropyl laurate, isopropyl palmitate, or similar esters; methyl alcohol, ethyl alcohol, denaturated ethyl alcohol, isopropyl alcohol, n-butyl alcohol, isobutyl alcohol, tert-butyl alcohol, sec-butyl alcohol, tert-amyl alcohol, 3-pentanol, actyl alcohol, benzyl alcohol, cyclohexanol, furfuryl alcohol, ethyl glycol, glycerin, diethyleneglycol, undecyl alcohol, or similar alcohols; methyl cellosolve, cellosolve, isopropyl cellosolve, butyl cellosolve, ethyleneglycol monomethyl ether, ethyleneglycol monoethyl ether, diethyleneglycol monomethyl ether, diethyleneglycol monoethyl ether, or similar ether alcohols; and carbon tetrachloride, methylene chloride, or similar chlorides.

There are no special restrictions with regard to the form of the organic oils, and these oils can be solid or liquid at 25° C. If the organic oil is liquid at 25° C., the viscosity of the oil at 25° C. should be in the range of 1 to 100,000,000 mPa·s, preferably in the range of 2 to 10,000,000 mPa·s.

The silicone oils and organic oils can be used independently or in a mixture with each other. When the silicone or organic oil are volatile, recovery of the silicon-containing particles can be facilitated by removal through devolatilization.

The silicone oils and organic oils are suitable for use in the manufacturing method of the invention. However, in order to improve compatibility of the aforementioned oils with the silicon-containing compound, it is recommended to use these oils in combination with the organic oil that possesses volatility. There are no special restrictions with regard to the amount in which the volatile organic oil can be added to the silicon or organic oil, but in general it may be recommended to add this oil in an amount of 1 to 1,000 parts by weight, preferably 10 to 500 parts by weight, and more preferably 50 to 250 parts by weight per 100 parts by weight of the total weight of the curable silicon-containing organic compound together with the silicone oil or organic oil.

Also, there are no special restriction with regard to the ratio of the silicon-containing compound and to the oil, but the above components can be used in a weight ratio of (80:20) to (0.1:99.9). If the curable silicon-containing compound is added in an amount exceeding the recommended upper limit, it will be difficult to control the diameter of the particles. If, on the other hand, the added amount of the curable silicon-containing compound is below the recommended lower limit, this will reduce the particle manufacturing efficiency.

In the manufacturing method of the invention, a uniform phase is prepared at least from the oil and the silicon-containing compound. This uniform phase can be prepared by a method known in the art. However, if the silicon-containing compound is solid at room temperature, mixing should be carried out with heating. The equipment suitable for this purpose is a Ross® mixer, planetary mixer, Henschel® mixer, ribbon blender, high-speed mixer, homomixer, paddle mixer, homo-dispenser, propeller-type type stirrer, homogenizer, or a vacuum kneader.

Although there are no special restrictions with regard to the reaction temperature for curing the silicon-containing compound in the method of the invention, it is recommended to have the reaction temperature in the range from room temperature to 250° C., preferably from 50 to 180° C. The aforementioned mixers and stirrers may be used also at the curing stage of the reaction mixture. By improving the radical reactivity of the reaction mixture due to irradiation with high-energy beams, it becomes possible to carry out the curing at room temperature. Curing of the silicon-containing compounds in the above-described manner induces phase separation of the particles from the silicone or organic oil and recovery of the silicon-containing particles.

The silicon-containing particles of the invention are characterized by being produced by the above-described method of the invention. Although there are no special restrictions with regard to the size of the silicon-containing particles, it is recommended that the average size of the particles be in the range of 5 nm to 10 μm, preferably 20 nm to 10 μm, and most preferably 20 nm to 5 μm. Also, there are no restriction with regard to the shape of the particles but a substantially spherical or regular spherical shape is preferable.

The oil composition of the invention is characterized by containing an oil and the aforementioned silicon-containing particles. The oil may comprise a silicone oil, or a silicon-free organic oil. Specific examples are the oils as described above. There are no restrictions with regard to the content of the silicon-containing particles in the composition but in general it is recommended that the particles are contained in an amount of 0.1 to 1,000 parts by weight, preferably 0.1 to 700 parts by weight, and most preferably, 0.1 to 200 parts by weight per 100 parts by weight of the oil.

The aforementioned oil composition may contain some arbitrary components, such as plasticizers, photostabilizers, antioxidants, fillers, coloring agents, treatment improvers, antistatic agents, UV absorbers, pigments, etc. The fillers may be represented by fumed silica, precipitated silica, baked silica, or a similar reinforcing filler; quartz powder, diatomaceous earth, calcium carbonate, zinc carbonate, zinc oxide, aluminum hydroxide, aluminum oxide, magnesium oxide, iron oxide, titanium oxide, mica, or a similar non-reinforcing filler; the aforementioned fillers surface treated with methyltrichlorosilane, dimethyldichlorosilane, ethyl trichlorosilane, or a similar organochlorosilane; hexamethyl disilazane, 1,1,3,3,5,5-hexamethyl cyclotrisilazane, or a similar organosilazane; methyltrimethoxysilane, dimethyldimethoxysilane, or a similar organoalkoxysilane, or other organic silicon-containing compounds; or mixtures of two or more of these fillers.

There are no restrictions with regard to the method for the preparation of the aforementioned oil composition, and, as has been described above with regard to the method of manufacturing the silicon-containing particles. In other words, an oil composition with silicon-containing particles dispersed in the oil is obtained by curing the silicon-containing compound in oil, or the thus obtained silicon-containing particles are first separated from the oil and then are mixed with another oil and, if necessary, with other arbitrary components. There are no special restrictions with regard to the method of mixing. For example, the components can be mixed with the use of a Henschel® mixer, ribbon blender, high-speed mixer, extruder, or any other suitable mixing equipment.

The oil composition of the invention can be used as a cosmetic or pharmaceutical raw material and may be prepared in the form of a liquid, cream, paste, or grease that comprises silicon-containing particles uniformly dispersed in oil.

The method of the invention for manufacturing a ceramic material is characterized by preparing a uniform phase from a curable composition that contains an oil that does not participate in the reaction of the composition and contains in one molecule one or more reactive functional groups per 50 silicon atoms, then curing the composition the aforementioned phase, and baking the silicon-containing particles phase-separated from the oil or an oil composition that comprises an oil and the silicon-containing particles. There are no special restrictions with regard to ceramification conditions by the method of the invention. For example, the silicon-containing particles or the oil composition that contains the silicon-containing particles may be baked in inert gas or in vacuum at a temperature ranging from 500 to 2,300° C., preferably 600 to 2,300° C., and most preferably 800 to 2,300° C.

The ceramic compositions obtained by the above method will depend on the raw materials and baking conditions, but for obtaining ceramics of SiOC type and SiCON type the silicon-containing particles or the oil composition that contains the silicon-containing particles should be baked in an inert gas or in a vacuum at a temperature ranging from 500 to 1,500° C., preferably 600 to 1,400° C., and most preferably 800 to 1,300° C. If the baking temperature exceeds the recommended upper limit, this will reduce the yield of the targeted ceramics, and the product will be converted into ceramics of a different. If, on the other hand, the baking temperature is below the recommended lower limit, this will lead to an insufficient degree of ceramification. Even if the ceramification process temperature (the finally reached temperature) is achieved in the prescribed range, it is recommended to conduct the ceramification process in two stages. More specifically, in the first stage heating can be carried out to a lower temperature, and the final temperature can be achieved at the second stage. Alternatively, the particle-formation stage and the ceramification stage can be combined into a single step.

The ceramic material obtained by the above method based on the oil composition that incorporates silicon-containing particles may include such elements as silicon, carbon, oxygen, and nitrogen and/or hydrogen, which may be distributed in a wide range. Normally, such a material is represented by the following formula: $SiO_xC_y$, where "x" and "y" are numbers that satisfy the following conditions: $0 \leq x \leq 2$, $0 < y < 100$, preferably $0 \leq x \leq 2$, $0 < y < 50$, and most preferably $0 \leq x \leq 2$, $0 < y < 20$. Although hydrogen and nitrogen are not included into the above formula, they may be present in the material in an amount less than 5 wt. %. The ceramic material of the invention may also include boron, titanium, phosphorus, tin, aluminum, magnesium, zinc, zirconium, or the like.

On the other hand, in obtaining a SiN-type, SiC-type, or similar type ceramic material, it is recommended to conduct baking in an atmosphere of an inert gas at a temperature not less than 1,300° C., preferably not less than 1,400° C., and more preferably not less than 1,500° C. At a temperature below 1,300° C., it will be impossible to achieve thermal decomposition. There are no special restrictions with regard to the upper limit of the baking temperature. It is preferable, however, to conduct baking at 2,300° C., and most preferably at 2,000° C. Even if the ceramification process temperature (the finally reached temperature) is achieved in the prescribed range, it is recommended to conduct the ceramification process in two stages. More specifically, in the first stage heating can be carried out to a lower temperature, and the final temperature can be achieved at the second stage. Alternatively, the particle-formation stage and the ceramification stage can be combined into a single step.

If the raw material consists of spherical silicon-containing particles, a so-called spherical ceramic material is obtained. Furthermore, when the oil composition that contains spherical silicon-containing particles is used, a carbon-based composite material with dispersed spherical ceramic is produced.

When ceramification is carried out in an inert gas, such a gas may comprise nitrogen, helium, or argon. Depending on the purpose of the ceramic material, the inert gas may include a reactive gas, such as hydrogen, methane, carbon monoxide, silane, gaseous ammonia, or the like. For example, a ceramic material that contains nitrogen can be obtained by baking either silicon-containing particles formed from a nitrogen-containing raw material or an oil composition that contains such particles in gaseous ammonia, or by baking the silicon-containing particles produced from nitrogen-containing raw material or the oil composition that contains such particles.

There are no special restrictions with regard to the heating furnace used for ceramification, and this process can be carried out either in a carbonization furnace of a fixed-bed type or a fluidized-bed type, provided that the furnace is capable of heating the product to an appropriate temperature. The baking furnace may be of a muffler type, lead hammer type, tunnel type, or a single furnace.

The manufacturing process of an SiC-type ceramic leaves trace amounts of free silica or free carbon. The residual free carbon can be removed by a decarbonization treatment that consists of heating the product to a temperature ranging from 600° C. to 900° C., preferably to a temperature not less than 700° C. The free silica is removed by treatment with a strong-acidic or base. Such a treatment can be carried out, e.g., with the use of a strong acid such as a hydrofluoric acid (HF), or a strong base such as potassium hydroxide (KOH). The use of hydrofluoric acid (HF) is preferable.

The ceramic material is treated by bringing it in contact with the treatment agent. Normally, the treatment agent is used in the form of an aqueous solution. If necessary, however, the ceramic material can be brought in contact with the treatment agent in air. In the case of a solution, the concentration of the treatment agent is normally in the range of 3 to 30 wt. %, preferably 15 to 25 wt. %. The treatment solution is used in an access amount relative to the amount in which the free silica is present in the ceramic material prior to the treatment.

Since the ceramic material is normally obtained in the form of lumps of particles, the lumps are crushed, and the crushed material is mixed with the treatment agent. The treatment time may range from 2 min. to 24 hours and preferably should be from 5 min. to 4 hours. There are no special restrictions with regard to the treatment temperature but it is recommended that the treatment temperature be below the boiling point of the treatment agent. Typically, the treatment is carried out in the atmosphere and at room temperature. The treated ceramic material is filtered, purified, and dried.

EXAMPLES

The silicon-containing particles of the invention, method for manufacturing thereof, the oil composition, the ceramic material, and method for manufacturing thereof will be further descried in more details by way of practical examples. In these examples, all viscosity values correspond to viscosity at 25° C.

Practical Example 1

A uniform solution was prepared by mixing a curable silicone composition consisting of 26.5 g of a methylhydrogenpolysiloxane capped at both molecular terminals with trimethylsiloxy groups (viscosity: 10 mPa·s; content of silicon-bonded hydrogen atoms: 1.6 wt. %) and 25 g of 1,3,5,7-tetramethyl-1,3,5,7-tetravinyl-cyclotetrasiloxane (viscosity=3.1 mPa·s) in 100 g of a dimethylpolysiloxane capped at both molecular terminals with trimethylsiloxy groups (viscosity: 1,000 Pa$\neq$s). Following this, a platinum-1,3-divinyltetramethyl disiloxane complex was added dropwise to the above solution (the complex was added at 20 ppm based on weight of the curable silicone composition in the solution), and the product was stirred sufficiently at room temperature. Following this, the mixture was heated while being stirred for 30 min. at 80° C. and then for another 60 min. with heating at 120° C. As a result, the aforementioned curable composition was cured to a sufficient degree to produce a composition in the form of a turbid gel. Observation of the obtained composition under a stereoscopic microscope showed that the composition consisted of silicon-containing particles uniformly dispersed in oil. The composition was extracted with toluene, whereby silicon-containing particles of a regular spherical shape with an average diameter of 0.8 μm were produced.

The obtained silicon-containing particles were placed into an alumina container and baked in a muffle furnace under a nitrogenous atmosphere for 2 hours at 600° C. and then for 1 hour at 1,000° C. After cooling, black particles were obtained with the 72% yield. Observation of the black particles under a scanning electron microscope (hereinafter referred to as "SEM") confirmed that the particles had a spherical form with an average particle diameter of 0.7 μm. X-ray photoelectron spectroscopy (hereinafter referred to as "XPS") confirmed that the particle composition consisted of $Si_{1.00}O_{1.83}C_{1.71}$. X-ray diffraction analysis [XRD] of peaks of microscopic particles (Cu—Kα) revealed that broad specific absorption peaks originating from the amorphous structure of SiOC ceramics were observed near the diffraction angle 2θ of about 21°.

Furthermore, the obtained oil composition that contained silicon-containing particles was also placed into an alumina container and baked in a muffle furnace under a nitrogenous atmosphere for 2 hours at 600° C. and then for 1 hour at 1,000° C. After cooling, a black silicon-based composite material was obtained with a 55% yield. SEM observation revealed that the composite material contained spherical ceramic particles having a diameter of 0.7 μm. Energy dispersive X-ray (hereinafter referred to as "EDX") analysis showed that the composite material consisted predominantly of a SiOC component. X-ray diffraction analysis [XRD] of peaks of microscopic particles (Cu—Kα) revealed that broad specific absorption peaks originating from the amorphous structure of SiOC ceramics were observed near the diffraction angle 2θ of about 20°.

Practical Example 2

A uniform solution was prepared by mixing a curable silicone composition consisting of 50.0 g of 1,3,5,7-tetramethyl-1,3,5,7-tetravinyl-cyclotetrasiloxane (viscosity=3.1 mPa·s) and 42.5 g of 1,1,3,3-tetramethyl-disiloxane in 100 g of a dimethylpolysiloxane capped at both molecular terminals with trimethylsiloxy groups (viscosity: 5,000 mPa·s). Following this, a platinum 1,3-divinyltetramethyl disiloxane complex was added dropwise to the above solution (the complex was added, in weight units, in the amount of 20 ppm per curable silicone composition contained in the above solution), and the product was stirred sufficiently at room temperature. Following this, the mixture was heated in an oven while being stirred for 30 min. at 80° C. and then for another 60 min. with heating at 120° C. As a result, the aforementioned curable composition was cured to a sufficient degree to produce a composition in the form of a turbid gel. Observation of the obtained composition under a stereoscopic microscope showed that the composition consisted of silicon-containing particles uniformly dispersed in oil. The composition was extracted with toluene, whereby silicon-containing particles of a regular spherical shape with an average diameter of 2.5 μm were produced.

Practical Example 3

A uniform solution was prepared by mixing a curable silicone composition consisting of 50.0 g of 1,3,5,7-tetramethyl-1,3,5,7-tetravinyl-cyclotetrasiloxane (viscosity=3.1 mPa·s) and 56.5 g of a methyltris(dimethylsiloxy) silane in 100 g of a dimethylpolysiloxane capped at both molecular terminals with trimethylsiloxy groups (viscosity: 5,000 mPa·s). Following this, a platinum 1,3-divinyltetramethyl disiloxane complex was added dropwise to the above solution (the complex was added, in weight units, in the amount of 20 ppm per curable silicone composition contained in the above solution), and the product was stirred sufficiently at room temperature. The stirring was discontinued. Following this, the mixture was heated in an oven for 30 min. at 80° C. and then for another 60 min. with heating at 120° C. As a result, the aforementioned curable composition was cured to a sufficient degree to produce a composition in the form of a turbid gel. Observation of the obtained composition under a stereoscopic microscope showed that the composition consisted of silicon-containing particles uniformly dispersed in oil. The composition was extracted with toluene, whereby silicon-containing particles of a regular spherical shape with an average diameter of 2.0 μm were produced.

The obtained silicon-containing particles were placed into an alumina container and baked in a muffle furnace under a nitrogenous atmosphere for 2 hours at 600° C. and then for 1 hour at 1,000° C. After cooling, black particles were obtained with a 82% yield. SEM observation of the black particles confirmed that the particles had a spherical form with an average particle diameter of 1.9 μm. XPS confirmed that the particle composition consisted of $Si_{1.00}O_{0.44}C_{0.47}$. X-ray diffraction analysis [XRD] of peaks of microscopic particles (Cu—Kα) revealed that broad specific absorption peaks originating from the amorphous structure of SiOC ceramics were observed near the diffraction angle 2θ of about 20°.

Furthermore, the obtained composition that contained silicon-containing particles was placed into an alumina container and baked in a muffle furnace under a nitrogenous atmosphere for 2 hours at 600° C. and then for 1 hour at 1,000° C. After cooling, a black silicon-based composite material was obtained with a 62% yield. SEM observation revealed that the composite material contained spherical ceramic particles having a diameter of 2.0 μm. EDX analysis showed that the composite material consisted predominantly of a SiOC component. X-ray diffraction analysis [XRD] of peaks of microscopic particles (Cu—Kα) revealed that broad specific absorption peaks originating from the amorphous structure of SiOC ceramics were observed near the diffraction angle 2θ of about 20°.

Practical Example 4

A uniform solution was prepared by mixing a curable silicone composition consisting of 50 g of 1,3,5,7-tetramethyl-1,3,5,7-tetravinyl-cyclotetrasiloxane (viscosity=3.1 mPa·s) and 42.0 g of 1,3,5,7-tetramethyl-cyclotetrasiloxane having viscosity of 1.0 mPa·s in 180 g of a dimethylpolysiloxane capped at both molecular terminals with trimethylsiloxy groups (viscosity: 1,000 Pa·s). Following this, a platinum 1,3-divinyltetramethyl disiloxane complex was added dropwise to the above solution (the complex was added, in weight units, in the amount of 20 ppm per curable silicone composition contained in the above solution), and the product was stirred sufficiently at room temperature. The stirring was discontinued. Following this, the mixture was heated in an oven for 30 min. at 80° C. and then for another 60 min. with heating at 120° C. As a result, the aforementioned curable composition was cured to a sufficient degree to produce a composition in the form of a turbid gel. Observation of the obtained composition under a stereoscopic microscope showed that the composition consisted of silicon-containing particles uniformly dispersed in oil. The composition was extracted with toluene whereby two types of silicon-containing particles of a regular spherical shape with an average diameters of 1.0 μm and 0.1 μm were produced.

The obtained silicon-containing particles were placed into an alumina container and baked in a muffle furnace under a nitrogenous atmosphere for 2 hours at 600° C. and then for 1 hour at 1,000° C. After cooling, black particles were obtained with the 82% yield. SEM observation of the black particles confirmed that the particles had a spherical form with an average particle diameters of 0.9 μm and 0.1 μm. XPS confirmed that the particle composition consisted of $Si_{1.00}O_{0.47}C_{0.49}$. XRD analysis of peaks of microscopic particles (Cu—Kα) revealed that broad specific absorption peaks originating from the amorphous structure of SiOC ceramics were observed near the diffraction angle 2θ of about 20°.

Furthermore, the obtained composition that contained silicon-containing particles was also placed into an alumina container and baked in a muffle furnace under a nitrogenous atmosphere for 2 hours at 600° C. and then for 1 hour at 1,000° C. After cooling, a black silicon-based composite material was obtained with a 55% yield. SEM observation revealed that the composite material contained spherical ceramic particles having a diameter of 0.9 μm. and 0.1 μm. EDX analysis showed that the composite material consisted predominantly of a SiOC component.

Practical Example 5

A uniform solution was prepared by mixing a curable silicone composition consisting of 43 g of a methylhydrogenpolysiloxane capped at both molecular terminals with trimethylsiloxy groups (viscosity: 10 mPa·s; content of silicon-bonded hydrogen atoms: 1.6 wt. %) and a 50 g of an 1,3-divinyltetramethy disiloxane in 100 g of a dimethylpolysiloxane capped at both molecular terminals with trimethylsiloxy groups (viscosity: 1,000 Pa·s). Following this, a platinum 1,3-divinyltetramethyl disiloxane complex was added dropwise to the above solution (the complex was added, in weight units, in the amount of 20 ppm per curable silicone composition contained in the above solution), and the product was stirred sufficiently at room temperature. The stirring was discontinued. Following this, the mixture was heated for 2 hours at 30° C. and then for another 60 min. with heating at 120° C. As a result, the aforementioned curable composition was cured to a sufficient degree to produce a composition in the form of a turbid gel. Observation of the obtained composition under a stereoscopic microscope showed that the composition consisted of silicon-containing particles uniformly dispersed in oil. The composition was extracted with toluene whereby silicon-containing particles of a regular spherical shape with an average diameter of 1.2 μm were produced.

The obtained silicon-containing particles were placed into an alumina container and baked in a muffle furnace under a nitrogenous atmosphere for 2 hours at 600° C. and then for 1 hour at 1,000° C. After cooling, black particles were obtained with a 82% yield. SEM observation of the black particles confirmed that the obtained ceramic particles had a spherical form with an average particle diameters of 1.15 μm. XPS confirmed that the particle composition consisted of $Si_{1.00}O_{0.42}C_{0.45}$. XRD analysis of peaks of microscopic particles (Cu—Kα) revealed that broad specific absorption peaks originating from the amorphous structure of SiOC ceramics were observed near the diffraction angle 2θ of about 20°.

Furthermore, the obtained composition that contained silicon-containing particles was placed into an alumina container and baked in a muffle furnace under a nitrogenous atmosphere for 2 hours at 600° C. and then for 1 hour at 1,000° C. After cooling, a black silicon-based composite material was obtained with a 65% yield. SEM observation revealed that the composite material contained spherical ceramic particles having a diameter of 1.15 μm. The EDX analysis showed that the composite material consisted predominantly of a SiOC component. The X-ray diffraction analysis [XRD] of peaks of microscopic particles (Cu—Kα) revealed that broad specific absorption peaks originating from the amorphous structure of SiOC ceramics were observed near the diffraction angle 2θ of about 20°.

Practical Example 6

A uniform solution was prepared by mixing a curable silicone composition consisting of 50.0 g of a dimethylpolysiloxane capped at both molecular terminals with hydroxyl groups (viscosity: 42 mPa·s; content of hydroxyl groups: 2.6 wt. %) and a 10 g of an 1,3,5,7-tetramethyl-cyclotetrasiloxane having viscosity of 1.0 mPa·s in 100 g of a dimethylpolysiloxane capped at both molecular terminals with trimethylsiloxy groups (viscosity: 1,000 Pa·s). Following this, 1.5 g of tin octylate were added to the solution, and the mixture was stirred sufficiently at room temperature. The stirring was discontinued. Next, the mixture was heated for 60 min at 80° C. As a result, the aforementioned curable composition was cured to a sufficient degree to produce a composition in the form of a turbid gel. Observation of the obtained composition under a stereoscopic microscope showed that the composition consisted of silicon-containing particles uniformly dispersed in oil. The composition was extracted with toluene, whereby silicon-containing particles of a regular spherical shape with an average diameter of 2.0 μm were produced.

Practical Example 7

A uniform solution was prepared by mixing 10 g of 1,1,3,3-tetramethyl-1,3-di(2-(3,4-epoxycyclohexyl)ethyl)disiloxane in 20.0 g of a phenylmethylpolysiloxane capped at both molecular terminals with hydroxyl groups (viscosity: 500 mPa·s; content of hydroxyl groups=3.2 wt. %). Following this, 2.0 g of triethylenetetramine were added to the solution, and the mixture was stirred sufficiently at room temperature. The stirring was discontinued. Following this, the mixture was heated in an oven for 60 min at 180° C., whereby the aforementioned 1,1,3,3-tetramethyl-1,3-di(2-(3,4-epoxycyclohexyl)ethyl)disiloxane was cured to a sufficient degree. The product was cooled to room temperature, and a finely dispersed composition was obtained. Observation of the obtained composition under a stereoscopic microscope showed that the composition consisted of silicon-containing particles uniformly dispersed in oil. The composition was extracted with toluene, whereby silicon-containing particles of a regular spherical shape with an average diameter of 1.5 μm were produced.

The obtained silicon-containing particles were placed into an alumina container and baked in a muffle furnace under a nitrogenous atmosphere for 2 hours at 600° C. and then for 1 hour at 1,000° C. After cooling, black particles were obtained with a 52% yield. SEM observation of the black particles confirmed that the material comprised a matrix with spherical ceramic particles having an average diameter of 1.2 p.m. EDX confirmed that the spherical structures corresponded to SiOC. XRD of peaks of microscopic particles (Cu—Kα) revealed that broad specific absorption peaks originating from the amorphous structure of SiOC ceramics were observed near the diffraction angle 2θ of about 25° and broad specific absorption peaks originating from the graphene structure were observed near the diffraction angle 2θ of about 44°.

Practical Example 8

A uniform solution was prepared by mixing 10 g of 1,1,3,3-tetramethyl-1,3-di(3-methacryloxypropyl)disiloxane in 20.0 g of a phenylmethylpolysiloxane capped at both molecular terminals with trimethylsiloxy groups (viscosity: 450 mPa·s). Following this, 0.5 g a cumene hydroperoxide was added to the solution, and the mixture was stirred sufficiently at room temperature. The stirring was discontinued. Following this, the mixture was heated in an oven for 60 min at 180° C., whereby the aforementioned 1,1,3,3-tetramethyl-1,3-di(3-methacryloxypropyl)disiloxane was cured to a sufficient degree. The product was cooled to room temperature, and a finely dispersed composition was obtained. Observation of the obtained composition under a stereoscopic microscope showed that the composition consisted of silicon-containing particles uniformly dispersed in oil. The composition was extracted with toluene, whereby silicon-containing particles of a regular spherical shape with an average diameter of 1.5 μm were produced.

Practical Example 9

A uniform solution was prepared by mixing a curable silicone composition consisting of the following components:

24 g of an organopolysiloxane of the following average unit formula:

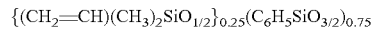
$\{(CH_2=CH)(CH_3)_2SiO_{1/2}\}_{0.25}(C_6H_5SiO_{3/2})_{0.75}$ 2.4 g of an organopolysiloxane of the following formula:

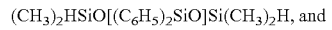
$(CH_3)_2HSiO[(C_6H_5)_2SiO]Si(CH_3)_2H$, and 2.4 g of an organopolysiloxane of the following formula:

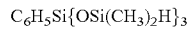
$C_6H_5Si\{OSi(CH_3)_2H\}_3$ in 90 g of a phenylmethylpolysiloxane capped at both molecular terminals with trimethylsiloxy groups (viscosity: 450 mPa·s). The obtained solution was combined with 0.01 g of a platinum-1,3-divinyltetramethyldisiloxane complex and 0.1 g of a methyl(tris(1,1-dimethyl-2-propynoxy)silane, and the mixture was stirred sufficiently at room temperature. The stirring was discontinued. Following this, the mixture was heated in an oven for 30 min at 110° C., whereby the curable silicone composition was cured to a sufficient degree. As a result, a gel-like composition was obtained. Observation of the obtained composition under a stereoscopic microscope showed that the composition consisted of silicon-containing particles uniformly dispersed in oil. The composition was extracted with toluene, whereby silicon-containing particles of a regular spherical shape with an average diameter of 2.5 μm were produced.

The obtained silicon-containing particles were placed into an alumina container and baked in a muffle furnace under a nitrogenous atmosphere for 2 hours at 600° C. and then for 1 hour at 1,000° C. After cooling, black particles were obtained with a 71% yield. SEM observation of the black particles confirmed that the obtained ceramic particles had a spherical form with an average particle diameter of 2.2 μm. XPS confirmed that the particle composition consisted of $Si_{1.00}O_{0.44}C_{2.47}$. XRD analysis of peaks of microscopic particles (Cu—Kα) revealed that broad specific absorption peaks originating from the amorphous structure of SiOC ceramics were observed near the diffraction angle 2θ of about 25°.

Practical Example 10

A uniform solution was prepared by mixing a curable silicone consisting of 21.5 g of a methylhydrogenpolysiloxane capped at both molecular terminals with trimethylsiloxy groups (viscosity: 10 mPa·s) and 25.0 g of 1,3,5,7-tetramethyl-1,3,5,7-tetravinyl-cyclotetrasiloxane (viscosity=3.1 mPa·s) in 150 g of a dioctyl phthalate. Following this, a platinum-1,3-divinyltetramethyl disiloxane complex was added dropwise to the above solution (the complex was added, in weight units, in the amount of 20 ppm per curable silicone composition contained in the above solution), and the product was stirred sufficiently at room temperature. The stirring was discontinued. Following this, the mixture was heated in an oven for 30 min. at 80° C. and then for another 60 min. with heating at 120° C. As a result, the aforementioned curable composition was cured to a sufficient degree to produce a curable silicone composition in the form of a turbid gel. Observation of the obtained composition under a stereoscopic microscope showed that the composition consisted of silicon-containing particles uniformly dispersed in oil. The composition was extracted with toluene, whereby silicon-containing particles of a regular spherical shape with an average diameter of 0.3 μM were produced.

The obtained silicon-containing particles were placed into an alumina container and baked in a muffle furnace under a nitrogenous atmosphere for 2 hours at 600° C. and then for 1 hour at 1,000° C. After cooling, black particles were obtained with a 72% yield. SEM observation of the black particles confirmed that the material comprised ceramic particles having an average diameter of 0.25 EDX confirmed that the spherical structures corresponded to SiOC. XRD of peaks of microscopic particles (Cu—Kα) revealed that broad specific absorption peaks originating from the amorphous structure of SiOC ceramics were observed near the diffraction angle 2θ of about 25° and broad specific absorption peaks originating from the graphene structure were observed near the diffraction angle 2θ of about 44°.

Practical Example 11

A uniform solution was prepared by mixing a curable silicone consisting of 13.2 g of a methylhydrogenpolysiloxane capped at both molecular terminals with trimethylsiloxy groups (viscosity: 10 mPa·s) and 12.5 g of 1,3,5,7-tetramethyl-1,3,5,7-tetravinyl-cyclotetrasiloxane (viscosity=3.1 mPa·s) in 300 g of 2,2,4-trimethylpentane. Following this, a platinum-1,3-divinyltetramethyl disiloxane complex was added dropwise to the above solution (the complex was added, in weight units, in the amount of 20 ppm per curable silicone composition contained in the above solution), and the reaction mixture was stirred for 30 min. at 80° C. and then with stirring in an oil bath for 60 min. at 120° C. As a result, a solution of a transparent silicone composition was obtained. Analysis of this solution with a sub-micron particle analyzer (Coulter model N4MD) showed that the solution contained silicon-containing particles with an average particle diameter of 37 nm. The silicon-containing particles were recovered by removing the solvent in vacuum by means of an evaporator.

The obtained silicon-containing particles were placed into an alumina container and baked in a muffle furnace under a nitrogenous atmosphere for 2 hours at 600° C. and then for 1 hour at 1,000° C. After cooling, black particles were obtained with a 85% yield. EDX analysis confirmed that the spherical structures consisted mainly of SiOC. The obtained SiOC ceramic was heated in an argon flow to a temperature of 1,600° C. at a heating rate of about 5° C./min. After 1 hour retention, the product was naturally cooled, baked for 1 hour at 700° C. in air, and cooled to room temperature. As a result, a grayish white product was obtained. This grayish white product was added to a 20 wt. % HF solution, stirred for 10 min. at room temperature, and filtered for obtaining a sample. The samples was washed with distilled water, until the cleaning solution became neutral, and then with ethanol. After drying at 150° C., a fine blue powder was obtained. An elemental analysis of the powder confirmed that 66 wt. % consisted of silicon, 31 wt. % consisted of carbon, and 0.9 wt. % consisted of oxygen. NMR spectral analysis of the solid silicon contained in the product revealed −21.31 ppm signals originating from SiC units. XRD of peaks of microscopic particles (Cu—Kα) revealed that broad specific absorption peaks originating from β-SiC were observed near the diffraction angles 2θ of about 35.76°; 60.04°; and 71.92°. SEM photographs and a particle diameter analysis showed that the particles were spherical in shape and had a small average diameter of 25 nm.

Practical Example 12

A uniform solution was prepared by mixing a curable silicone consisting of the following components: 500 g of a dimethylpolysiloxane capped at both molecular terminals with trimethylsiloxy groups (viscosity=5,000 mPa·s); 30.5 g of a methylhydrogenpolysiloxane capped at both molecular terminals with trimethylsiloxy groups (viscosity: 10 mPa·s, content of silicon-bonded hydrogen atoms=1.6 wt. %); 20 g of 1,4-divinylhexane; and 0.01 g of a methyltri(2-methyl-2-butynoxy)silane. Following this, a platinum-1,3-divinyltetramethyl disiloxane complex was added dropwise to the above solution (the complex was added, in weight units, in the amount of 20 ppm per curable silicone composition contained in the above solution), and the reaction mixture was stirred sufficiently at room temperature. The stirring was discontinued. Following this, the mixture was heated in an oven for 30 min. at 80° C., and then heated for 60 min. at 120° C. This was sufficient time for curing the obtained curable silicone composition. As a result, a white turbid gel-like silicone composition was produced. Observation of the obtained composition under a stereoscopic microscope showed that the composition consisted of cross-linked silicone particles uniformly dispersed in oil. It was seen that these cross-linked silicone particles had a spherical shape. The composition was extracted with toluene, silicone oil was removed, and regularly spherical silicon-containing particles with an average diameter of 0.3 μm were obtained.

The obtained silicon-containing particles were placed into an alumina container and baked in a muffle furnace under a nitrogenous atmosphere for 2 hours at 600° C. and then for 1 hour at 1,000° C. After cooling, black particles were obtained with a 40% yield. EDX analysis confirmed that the spherical structures consisted mainly of SiOC.

The obtained SiOC ceramic was heated in an argon flow to a temperature of 1,600° C. at a heating rate of about 5° C./min. After 1 hour retention, the product was naturally cooled, baked for 1 hour at 700° C. in air, and cooled to room temperature. As a result, a grayish white product was obtained. This grayish white product was added to a 20 wt. % HF solution, stirred for 10 min. at room temperature, and filtered for obtaining a sample. The samples was washed with distilled water, until the cleaning solution became neutral, and then with ethanol. After drying at 150° C., a fine blue powder was obtained. (In terms of a weight ratio to siloxane, the yield was 42%). An elemental analysis of the product confirmed that 65.2 wt. % consisted of silicon, 34.1 wt. % consisted of carbon, and 0.7 wt. % consisted of oxygen. NMR spectral analysis of the solid silicon contained in the product revealed 21.31 ppm signals originating from SiC units. XRD of peaks of microscopic particles (Cu—Kα) revealed that specific absorption peaks originating from β-SiC were observed near the diffraction angles 2θ of about 35.76°; 60.04°; and 71.92°. SEM photographs and a particle diameter analysis showed that the particles were spherical in shape and had a small average diameter of 0.2 µm.

Practical Example 13

A uniform solution was prepared by mixing a curable silicone consisting of 21.5 g of a methylhydrogenpolysiloxane capped at both molecular terminals with trimethylsiloxy groups (viscosity: 10 mPa·s; content of silicon-bonded hydrogen atoms=1.6 wt. %) and 25 g of 1,3-divinyltetramethyldisiloxane in 100 g of a dimethylpolysiloxane capped at both molecular terminals with trimethylsiloxy groups (viscosity=5,000 mPa·s). Following this, a platinum-1,3-divinyltetramethyl disiloxane complex was added dropwise to the above solution (the complex was added, in weight units, in the amount of 20 ppm per curable silicone composition contained in the above solution), and the reaction mixture was stirred for a sufficient time at room temperature. The stirring was discontinued. Following this, the product was heated for 2 hours at 30° C., and then for 60 min. at 120° C. As a result, the aforementioned curable silicone composition was cured to a sufficient degree to produce a curable silicone composition in the form of a turbid gel. Observation of the obtained composition under a stereoscopic microscope showed that the composition consisted of silicon-containing particles uniformly dispersed in oil. The composition was extracted with toluene, whereby silicon-containing particles of a regular spherical shape with an average diameter of 0.8 µm were produced.

The obtained silicon-containing particles were placed into an alumina container and baked in a muffle furnace under a nitrogenous atmosphere for 2 hours at 600° C. and then for 1 hour at 1,000° C. After cooling, black particles were obtained with the 72% yield. The SEM observations showed that obtained spherical ceramic particles had an average particle diameter of about 0.6 µm.

The aforementioned composition was also placed into an alumina container and baked in a muffle furnace under a nitrogenous atmosphere for 2 hours at 600° C. and then for 1 hour at 1,000° C. After cooling, black silicon-containing composite material was obtained with 65% yield. SEM observations showed that obtained spherical ceramic particles had an average particle diameter of about 0.6 µm.

The composition with silicon-containing cross-linked particles was placed into an alumina container and baked in a muffle furnace under a nitrogenous atmosphere for 2 hours at 600° C. and then heated to 1,600° C. After 1 hour retention, the product was naturally cooled, baked for 1 hour at 700° C. in air, and cooled to room temperature. As a result, a grayish white product was obtained. (in terms of a weight ratio to siloxane, the yield was 45%). This grayish white product was added to a 20 wt. % HF solution, stirred for 10 min. at room temperature, and filtered for obtaining a sample. The samples was washed with distilled water, until the cleaning solution became neutral, and then with ethanol. After drying at 150° C., a fine blue powder was obtained. NMR spectral analysis of the solid silicon contained in the product revealed 21.31 ppm signals originating from SiC units. XRD of peaks of microscopic particles (Cu—Kα) revealed that specific absorption peaks originating from β-SiC were observed near the diffraction angles 2θ of about 35.76°; 60.04°; and 71.92°. SEM photographs and a particle diameter analysis showed that the particles were spherical in shape and had a small average diameter of 0.4 µm.

The obtained ceramic was heated in an argon flow to a temperature of 1,600° C. at a heating rate of about 5° C./min. After 1 hour retention, the product was naturally cooled, baked for 1 hour at 700° C. in air, and cooled to room temperature. As a result, a grayish white product was obtained. This grayish white product was added to a 20 wt. % HF solution, stirred for 10 min. at room temperature, and filtered for obtaining a sample. The samples was washed with distilled water, until the cleaning solution became neutral, and then with ethanol. After drying at 150° C., a fine blue powder was obtained. An elemental analysis of the product confirmed that 67.0 wt. % consisted of silicon, 33.5 wt. % consisted of carbon, and 0.5 wt. % consisted of oxygen. NMR spectral analysis of the solid silicon contained in the product revealed −21.31 ppm signals originating from SiC units. XRD of peaks of microscopic particles (Cu—Kα) revealed that specific absorption peaks originating from β-SiC were observed near the diffraction angles 2θ of about 35.76°; 60.04°; and 71.92°. SEM photographs and a particle diameter analysis showed that the particles were spherical in shape and had a small average diameter of 0.4 µm.

Practical Example 14

A uniform paraffin composition was prepared by mixing a curable silicone composition composed of 5 g of a tetramethyl-tetravinyl cyclotetrasiloxane and 22.4 g of an organopolysiloxane of the following formula:

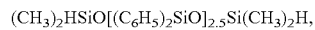

$(CH_3)_2HSiO[(C_6H_5)_2SiO]_{2.5}Si(CH_3)_2H$, in 60 g of a liquid paraffin having density 0.87 g/ml (at 15° C.) and viscosity of about 60 mm²/s (at 40° C.). Following this, a platinum-1,3-divinyltetramethyl disiloxane complex was added dropwise to the aforementioned paraffin composition (the complex was added, in weight units, in the amount of 10 ppm of metallic platinum per curable silicone composition), and the reaction mixture was stirred for a sufficient time at room temperature. The stirring was discontinued. Following this, the product was heated in an oven for 30 min. at 120° C. As a result, a turbid paraffin composition was obtained. The composition was extracted with toluene, whereby regularly spherical silicon-containing particles having an average diameter of 1.5 µm were obtained.

The obtained silicon-containing particles were placed into an alumina container and baked in a muffle furnace under a nitrogenous atmosphere for 2 hours at 600° C. and then for 1 hour at 1,000° C. After cooling, black particles were obtained with a 72% yield. SEM observations showed that the obtained spherical ceramic particles had an average particle diameter of about 1.35 µm.

The obtained ceramic was heated in an argon flow to a temperature of 1,600° C. at a heating rate of about 5° C./min. After 1 hour retention, the product was naturally cooled, baked for 1 hour at 700° C. in air, and cooled to room temperature. As a result, a grayish white product was obtained. This grayish white product was added to a 20 wt. % HF solution, stirred for 10 min. at room temperature, and filtered for obtaining a sample. The samples was washed with distilled water, until the cleaning solution became neutral, and then with ethanol. After drying at 150° C., a fine blue powder was obtained. An elemental analysis of the product confirmed that 67.0 wt. % consisted of silicon, 33.5 wt. % consisted of carbon, and 0.5 wt. % consisted of oxygen. NMR spectral analysis of the solid silicon contained in the product revealed −21.31 ppm signals originating from SiC units. XRD of peaks of microscopic particles (Cu—Kα) revealed that specific absorption peaks originating from β-SiC were observed near the diffraction angles 2θ of about 35.76°; 60.04°; and 71.92°.

SEM photographs and a particle diameter analysis showed that the particles were spherical in shape and had a small average diameter of 0.9 μm.

Comparative Example 1

A curable silicone composition was prepared by mixing 10 g of 1,3,5,7-tetramethyl-1,3,5,7-tetravinyl-cyclotetrasiloxane and 44.8 g of an organopolysiloxane of the following formula:

$(CH_3)_2HSiO[(C_6H_5)_2SiO]_{2.5}Si(CH_3)_2H$, in 100 g of a dimethylpolysiloxane capped at both molecular terminals with trimethylsiloxy groups (viscosity of about 1,000 Pa·s). However, the obtained composition had white turbidity and decomposed into two separate layers. A platinum-1,3-divinyltetramethyl disiloxane complex was added dropwise to the aforementioned composition (the complex was added, in weight units, in the amount of 20 ppm of metallic platinum per curable silicone composition), and the mixture was stirred for a sufficient time at room temperature. The stirring was discontinued. Following this, the product was heated in an oven for 30 min. at 80° C. and for 60 min. at 120° C. As a result, a two-layer mixture consisting of a cured-silicone layer and an oil layer was obtained. The mixture was observed under a stereoscopic microscope, but the observation did not reveal the presence of silicon-containing particles. The product was in a gel form. Spherical silicon-containing particles were absent.

INDUSTRIAL APPLICABILITY

The particle-manufacturing method of the invention makes it possible to produce spherical silicon-containing particles of a controllable diameter and with a reduced amount of impurities such as surfactants. Since, in addition to suitability for use as a raw material for cosmetic products and additives for organic resins, the silicon-containing particles of the invention possess heat-resistant and electric properties inherent in silicone, these particles may find application also as materials for electric and electronic industry and as additives to electrically conductive liquids, or the like. The organic polymer compositions that incorporate such spherical silicon-containing particles may be used for manufacturing fireproof adhesive agents and fireproof films.

The ceramic materials-manufacturing method of the invention makes it possible to produce ceramic materials with extremely small and controllable diameter in a simple process. Such ceramic materials can be used as various additives to organic resins, cosmetic materials, etc.

The invention claimed is:

1. A method for manufacturing a ceramic material, said method comprising:
preparing a uniform phase comprising, at least, a curable composition that includes a silicon-containing compound having in one molecule one or more reactive functional groups, wherein a ratio between the functional groups and silicon atoms present in the silicon-containing compound is greater than 1:50, and a linear silicone oil or a silicon-free organic oil, with a viscosity at 25° C. of 2 to 10,000,000 mPa·s, that does not participate in curing of the curable composition;
curing the curable composition to obtain silicon-containing particles;
causing phase separation from the linear silicone oil or the silicon-free organic oil to obtain the silicon-containing particles, and
baking the silicon-containing particles or a composition comprising the silicon-containing particles and the linear silicone oil or the silicon-free organic oil, to obtain the ceramic material.

2. The method of claim 1, wherein the silicon-containing compound is a compound selected from the group consisting of siloxanes, silanes, silazanes, carbosilanes, and mixtures thereof.

3. The method of claim 1, wherein the reactive functional groups of the silicon-containing compound possess addition reactivity, condensation reactivity, ring-opening reactivity, or radical reactivity.

4. The method of claim 1, wherein the silicon-containing compound is a siloxane compound represented by the following average unit formula:

$(R^1_3SiO_{1/2})_a(R^1_2SiO_{2/2})_b(R^1SiO_{3/2})_c(SiO_{4/2})_d$ wherein $R^1$ designates identical or different, substituted or unsubstituted monovalent hydrocarbon groups, hydrogen atoms, halogen atoms, epoxy-containing organic groups, acryl-containing organic groups, methacryl-containing organic groups, amino-containing organic groups, mercapto-containing organic groups, alkoxy groups, or hydroxy groups; "a", "b", "c", and "d" are numbers, which may be equal to or greater than 0 and equal to or less than 1 and which satisfy the following condition:

(a+b+c+d)=1; however, "a", "b", and "c" cannot be equal to 0 at the same time; the aforementioned silicon-containing compound may contain in one molecule one or more alkenyl groups, hydrogen atoms, halogen atoms, epoxy-containing organic groups, acryl-containing organic groups, methacryl-containing organic groups, amino-containing organic groups, mercapto-containing organic groups, alkoxy groups, or hydroxy groups per 50 silicon atoms.

5. The method of claim 1, wherein the curable composition comprises a silicon-containing compound having unsaturated aliphatic carbon-carbon bonds, a compound having silicon-bonded hydrogen atoms, and a hydrosilylation catalyst.

6. The method of claim 1, wherein the curable composition comprises a silicon-free organic compound with unsaturated aliphatic carbon-carbon bonds, a compound having silicon-bonded hydrogen atoms, and a hydrosilylation catalyst.

7. The method of claim 1, wherein the curable composition comprises a silicon-containing compound having silanol groups, a compound having silicon-bonded hydrogen atoms, and a condensation catalyst.

8. The method of claim 1, wherein the curable composition comprises a silicon-containing compound having unsaturated aliphatic carbon-carbon bonds and a radical initiation agent.

9. The method of claim 1, wherein the curable composition comprises a silicon-containing compound having epoxy-containing organic groups and an epoxy-resin-curing agent.

10. The method of claim 1, wherein a weight ratio of the silicon-containing compound to the linear silicone oil or the silicon-free organic oil ranges from (80:20) to (0.1:99.9) in the uniform phase.

11. The method of claim 1, wherein the average particle diameter of the silicon-containing particles ranges from 5 nm to 10 μm.

12. A ceramic material obtained by a method according to claim 1.

* * * * *